US011622117B2

(12) United States Patent
Xu et al.

(10) Patent No.: US 11,622,117 B2
(45) Date of Patent: Apr. 4, 2023

(54) METHOD AND APPARATUS FOR RATE-ADAPTIVE NEURAL IMAGE COMPRESSION WITH ADVERSARIAL GENERATORS

(71) Applicant: TENCENT AMERICA LLC, Palo Alto, CA (US)

(72) Inventors: Kaidi Xu, Palo Alto, CA (US); Wei Wang, San Jose, CA (US); Wei Jiang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/356,722

(22) Filed: Jun. 24, 2021

(65) Prior Publication Data
US 2022/0030246 A1  Jan. 27, 2022

Related U.S. Application Data

(60) Provisional application No. 63/054,648, filed on Jul. 21, 2020, provisional application No. 63/054,665, (Continued)

(51) Int. Cl.
H04N 19/147 (2014.01)
H04N 19/126 (2014.01)
G06N 3/04 (2006.01)

(52) U.S. Cl.
CPC ......... H04N 19/147 (2014.11); G06N 3/0454 (2013.01); H04N 19/126 (2014.11)

(58) Field of Classification Search
CPC .. H04N 19/147; H04N 19/126; H04N 19/149; H04N 19/115; G06N 3/0454; G06N 3/0472; G06N 3/084
See application file for complete search history.

(56) References Cited

U.S. PATENT DOCUMENTS

2017/0124432 A1* 5/2017 Chen .................... G06T 1/60
2019/0377955 A1* 12/2019 Swaminathan .... H04N 21/8456
(Continued)

FOREIGN PATENT DOCUMENTS

WO    2018/150083 A1    8/2018

OTHER PUBLICATIONS

International Search Report dated Nov. 22, 2021, issued by the International Searching Authority in application No. PCT/US2021/042292.
(Continued)

Primary Examiner — Tracy Y. Li
(74) Attorney, Agent, or Firm — Sughrue Mion, PLLC

(57) ABSTRACT

A method of rate-adaptive neural image compression with adversarial generators is performed by at least one processor and includes obtaining a first feature of an input image, using a first portion of a first neural network, generating a first substitutional feature, based on the obtained first feature, using a second neural network, and encoding the generated first substitutional feature, using a second portion of the first neural network, to generate a first encoded representation. The method further includes compressing the generated first encoded representation, decompressing the compressed representation, and decoding the decompressed representation, using a third neural network, to reconstruct a first output image.

20 Claims, 11 Drawing Sheets

Related U.S. Application Data filed on Jul. 21, 2020, provisional application No. 63/054,662, filed on Jul. 21, 2020.

(56) References Cited

U.S. PATENT DOCUMENTS

| | | | |
|---|---|---|---|
| 2020/0134380 A1* | 4/2020 | Xu | G06N 3/084 |
| 2020/0183032 A1 | 6/2020 | Liu et al. | |
| 2021/0303926 A1* | 9/2021 | Narayanan | G06K 9/6257 |

OTHER PUBLICATIONS

Written Opinion dated Nov. 22, 2021, issued by the International Searching Authority in application No. PCT/US2021/042292.
Extended European Search Report dated Oct. 31, 2022 in European Application No. 21846823.9.
Yang et al., "Variable Rate Deep Image Compression With Modulated Autoencoder", IEEE Signal Processing Letters, 2020, vol. 27, pp. 331-335 (5 pages total).
Chen et al., "Neural Image Compression via Non-Local Attention Optimization and Improved Context Modeling", arXiv.org, Oct. 11, 2019, pp. 1-13 (13 pages total).

* cited by examiner

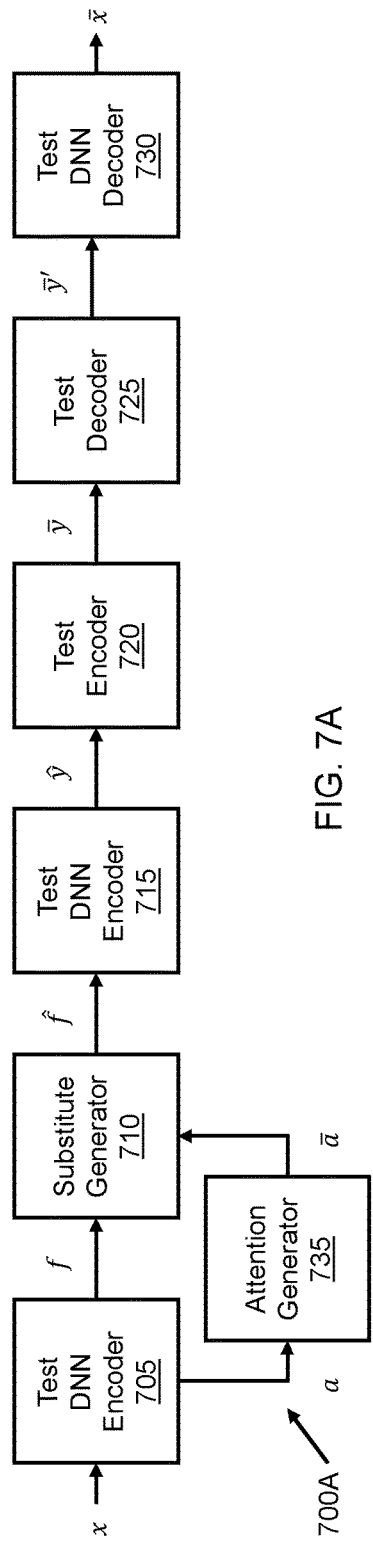
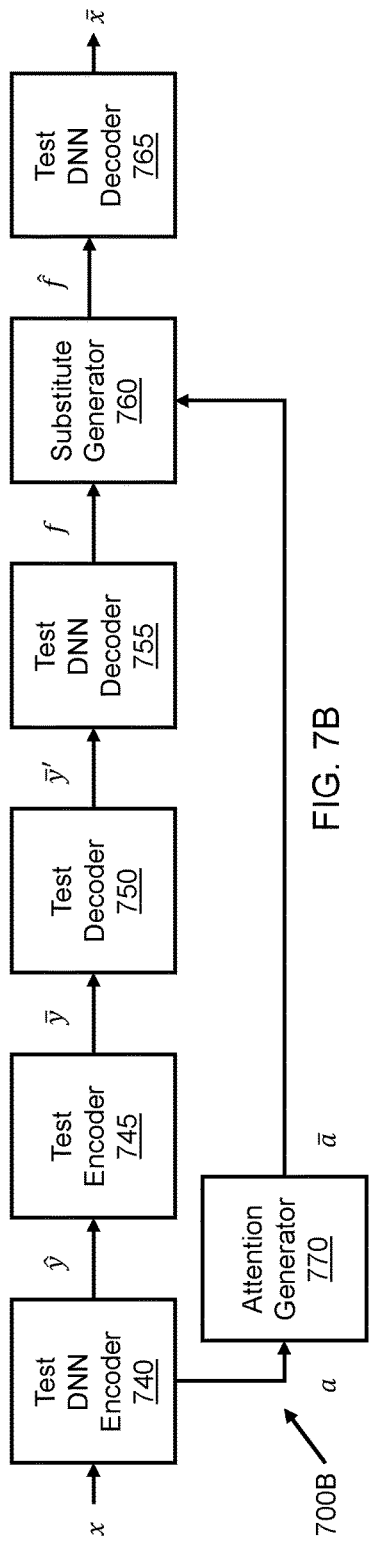
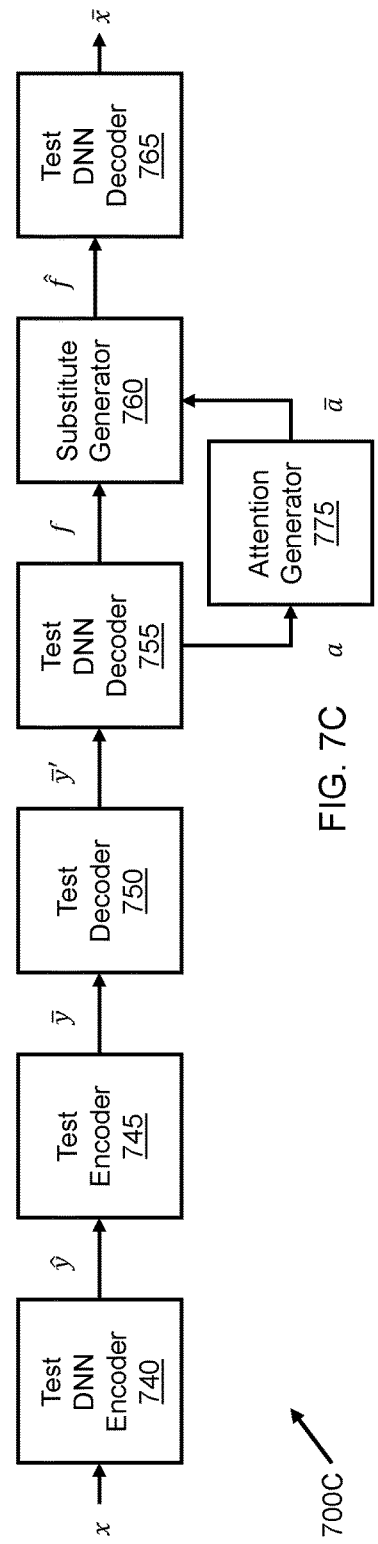
FIG. 7A
FIG. 7B
FIG. 7C

METHOD AND APPARATUS FOR RATE-ADAPTIVE NEURAL IMAGE COMPRESSION WITH ADVERSARIAL GENERATORS

CROSS-REFERENCE TO RELATED APPLICATIONS

This application is based on and claims priority to U.S. Provisional Patent Application No. 63/054,648, filed on Jul. 21, 2020, U.S. Provisional Patent Application No. 63/054,662, filed on Jul. 21, 2020, and U.S. Provisional Patent Application No. 63/054,665, filed on Jul. 21, 2020, in the U.S. Patent and Trademark Office, the disclosures of which are incorporated by reference herein in their entireties.

BACKGROUND

ISO/IEC MPEG (JTC 1/SC 29/WG 11) has been actively searching for potential needs for standardization of future video coding technology. ISO/IEC JPEG has established JPEG-AI group focusing on AI-based end-to-end neural image compression using deep neural networks (DNNs). The success of recent approaches has brought more and more industrial interests in advanced neural image and video compression methodologies.

Flexible bit-rate control remains a challenging issue for previous neural image compression (NIC) methods. Conventionally, it may require training multiple model instances targeting, at each desired Rate-Distortion (R-D), a trade-off between the rate and distortion (quality of compressed images) individually. All these multiple model instances may need to be stored and deployed on the decoder side to reconstruct images from different bit rates. This may be prohibitively expensive for many applications with limited storage and computing resources.

SUMMARY

According to embodiments, a method of rate-adaptive neural image compression with adversarial generators is performed by at least one processor and includes obtaining a first feature of an input image, using a first portion of a first neural network, generating a first substitutional feature, based on the obtained first feature, using a second neural network, and encoding the generated first substitutional feature, using a second portion of the first neural network, to generate a first encoded representation. The method further includes compressing the generated first encoded representation, decompressing the compressed representation, and decoding the decompressed representation, using a third neural network, to reconstruct a first output image.

According to embodiments, an apparatus for rate-adaptive neural image compression with adversarial generators includes at least one memory configured to store program code, and at least one processor configured to read the program code and operate as instructed by the program code. The program code includes first obtaining code configured to cause the at least one processor to obtain a first feature of an input image, using a first portion of a first neural network, first generating code configured to cause the at least one processor to generate a first substitutional feature, based on the obtained first feature, using a second neural network, and first encoding code configured to cause the at least one processor to encode the generated first substitutional feature, using a second portion of the first neural network, to generate a first encoded representation. The program code further includes compressing code configured to cause the at least one processor to compress the generated first encoded representation, decompressing code configured to cause the at least one processor to decompress the compressed representation, and first decoding code configured to cause the at least one processor to decode the decompressed representation, using a third neural network, to reconstruct a first output image.

According to embodiments, a non-transitory computer-readable medium stores instructions that, when executed by at least one processor for rate-adaptive neural image compression with adversarial generators, cause the at least one processor to obtain a first feature of an input image, using a first portion of a first neural network, generate a first substitutional feature, based on the obtained first feature, using a second neural network, and encode the generated first substitutional feature, using a second portion of the first neural network, to generate a first encoded representation. The instructions, when executed by the at least one processor, further cause the at least one processor to compress the generated first encoded representation, decompress the compressed representation, and decode the decompressed representation, using a third neural network, to reconstruct a first output image.

BRIEF DESCRIPTION OF THE DRAWINGS

FIGS. 7A, 7B and 7C are block diagrams of test apparatuses for rate-adaptive neural image compression with attention-based adversarial generators, according to embodiments.

DETAILED DESCRIPTION

The disclosure describes methods and apparatuses for compressing an input image by a NIC framework with adaptive compression rates. Only a few model instances are trained for anchor compression rates, and a compact adversarial generator is used to achieve intermediate compression rates by adapting anchor model instances. Further, an attention-based adversarial generator is used on either the encoder side or the decoder side to achieve intermediate compression rates by adapting anchor model instances.

Figure 1:
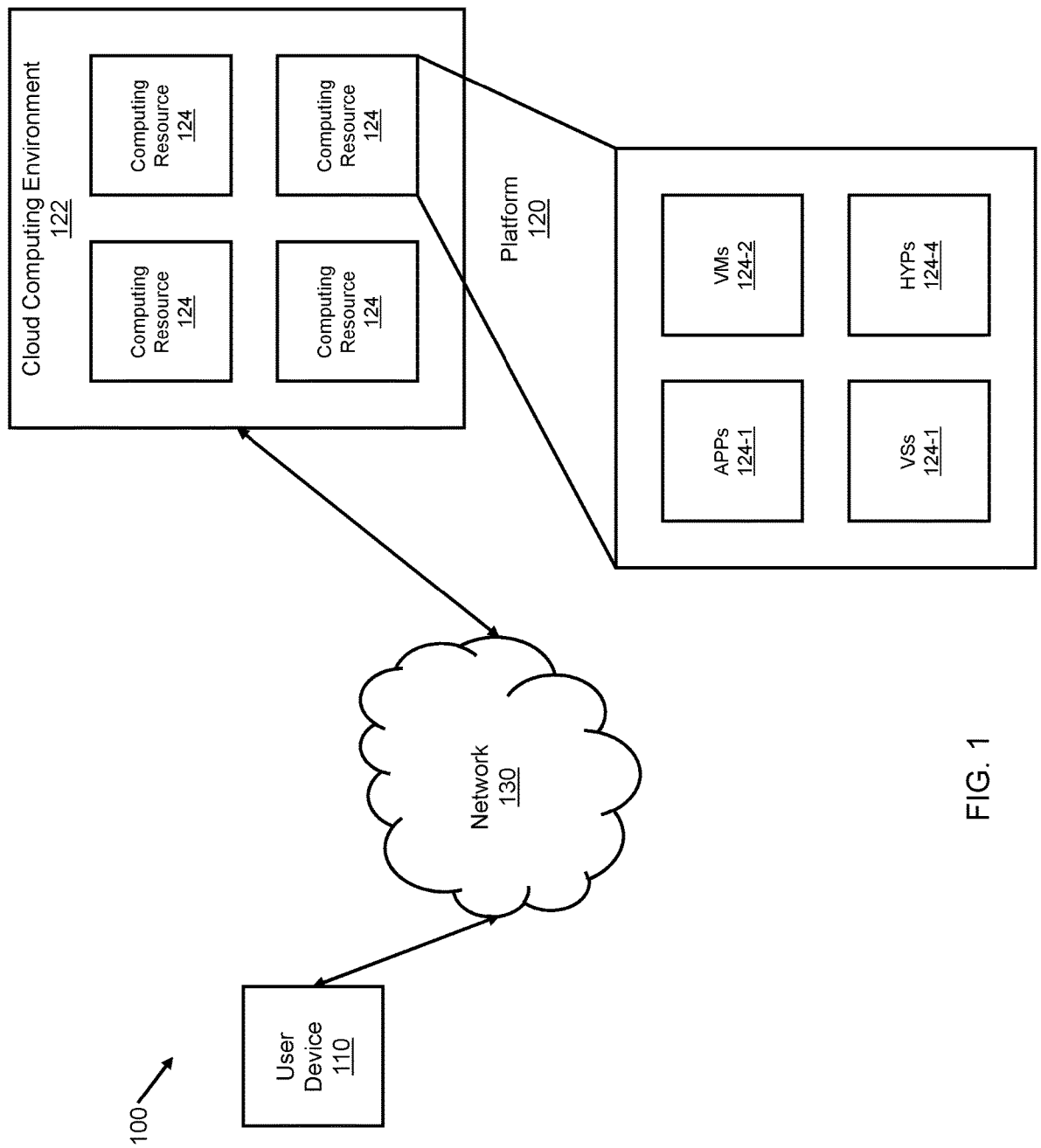
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
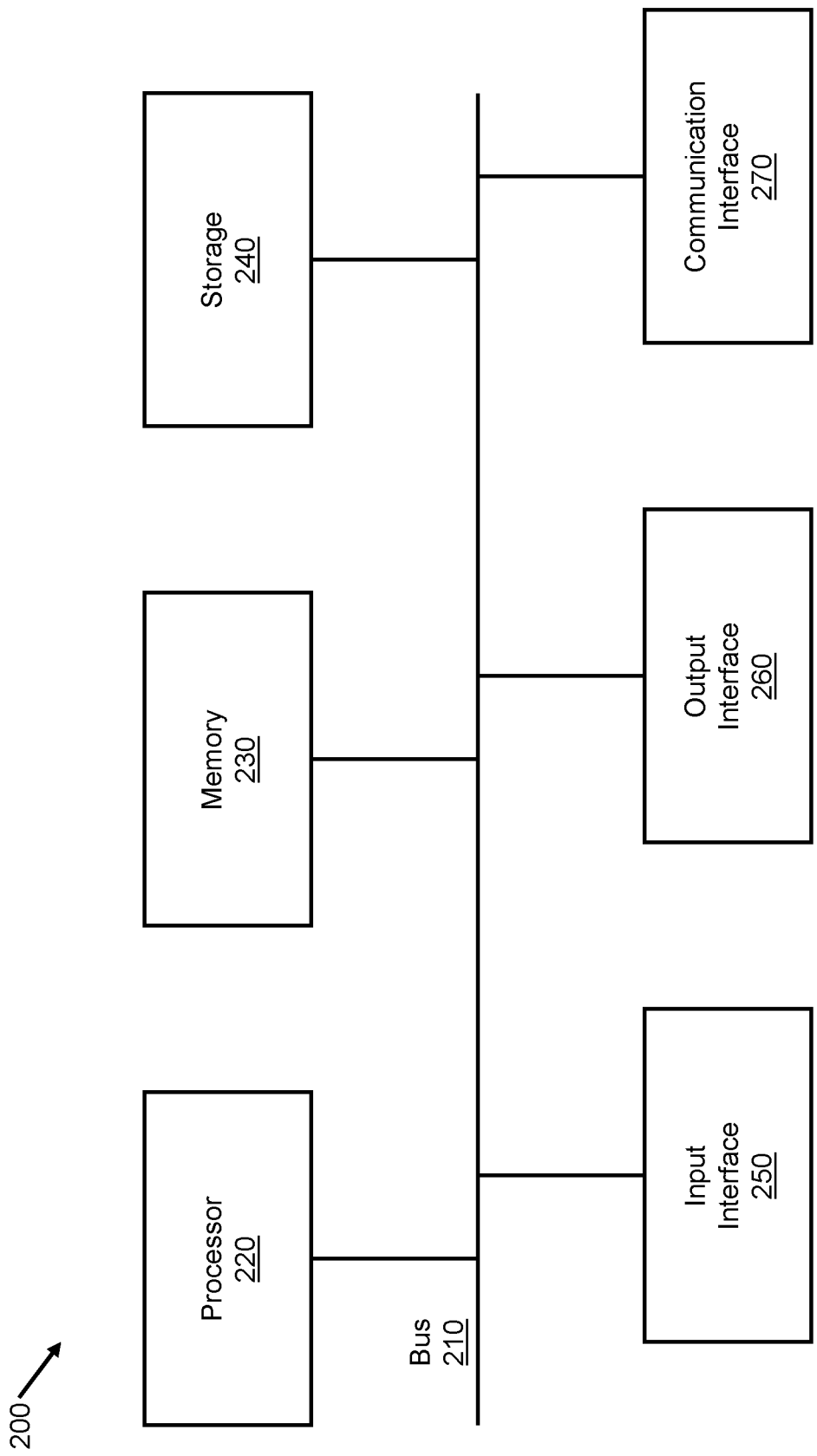
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage 240, an input interface 250, an output interface 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage 240 stores information and/or software related to the operation and use of the device 200. For example, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input interface 250 includes a component that permits the device 200 to receive information, such as via user input (e.g., a touch screen display, a keyboard, a keypad, a mouse, a button, a switch, and/or a microphone). Additionally, or alternatively, the input interface 250 may include a sensor for sensing information (e.g., a global positioning system (GPS) component, an accelerometer, a gyroscope, and/or an actuator). The output interface 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage 240. A computer-readable medium is defined herein as a non-transitory memory device. A memory device includes memory space within a single physical storage device or memory space spread across multiple physical storage devices.

Software instructions may be read into the memory 230 and/or the storage 240 from another computer-readable medium or from another device via the communication interface 270. When executed, software instructions stored in the memory 230 and/or the storage 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for rate-adaptive neural image compression with adversarial generators will now be described in detail.

Embodiments described herein include a multi-rate NIC framework, in which only a few NIC model instances are learned and deployed targeting a few anchor compression rates, while the other intermediate compression rates are achieved by using a compact adversarial generator to adapt the anchor model instances, or using an attention-based adversarial generator to adapt anchor model instances, either on the encoder side or on the decoder side. The generator is a compact DNN that can be used as a plug-in component added to any underlying NIC model (e.g., in front of or between two layers of the NIC model), and the generator aims at generating, from the feature of the original NIC model (e.g., the input image if put in front of the NIC model or the intermediate feature map if put between two layers), a substitute of the feature. Thus, the newly generated substitute can obtain the desired compression rate.

Given an input image x, the target of the test stage of a NIC workflow can be described as follows. A compressed representation $\bar{y}$ that is compact for storage and transmission is computed. Then, based on the compressed representation $\bar{y}$, an output image $\bar{x}$ is reconstructed, and the reconstructed output image $\bar{x}$ may be similar to the original input image x. The process of computing the compressed representation $\bar{y}$ may separated into two parts: an DNN encoding process that uses a test DNN encoder to compute a DNN encoded representation y, and then an encoding process in which y is encoded through a test encoder (typically including quantization and entropy coding) to generate the compressed representation $\bar{y}$. Accordingly, the decoding process is separated into two parts: a decoding process in which the compressed representation $\bar{y}$ is decoded (typically including decoding and dequantization) by a test decoder to generate the recovered $\bar{y}'$, and then an DNN decoding process in which the recovered representation $\bar{y}'$ is used by a test DNN decoder to reconstruct an image $\bar{x}$. In this disclosure, there are not any restrictions on the network structures of the test DNN encoder used for DNN encoding or the test DNN decoder used for DNN decoding. There are not any restrictions on the methods (the quantization methods and the entropy coding methods) used for encoding or decoding either.

To learn the NIC model, two competing targets are dealt with: better reconstruction quality versus less bit consumption. A loss function $D(x, \bar{x})$ is used to measure the reconstruction error, which is called the distortion loss, such as the peak signal-to-noise ratio (PSNR) and/or structural similarity index measure (SSIM). A rate loss $R(\bar{y})$ is computed to measure the bit consumption of the compressed representation $\bar{y}$. Therefore, a trade-off hyperparameter $\lambda$ is used to optimize a joint R-D loss:

$$L(x, \bar{x}, \bar{y}) = D(x, \bar{x}) + \lambda R(\bar{y}). \quad (1)$$

Training with a large hyperparameter $\lambda$ results in compression models with smaller distortion but more bits consumption, and vice versa. Traditionally, for each pre-defined hyperparameter $\lambda$, a NIC model instance will be trained, which will not work well for other values of the hyperparameter $\lambda$. Therefore, to achieve multiple bit rates of the compressed stream, it may be required to train and store multiple model instances, one targeting one desired hyperparameter $\lambda$.

In this disclosure, a rate-adaptive NIC framework uses an add-on compact adversarial generator on either the encoder side or the decoder side to adapt a model instance trained for one anchor R-D trade-off hyperparameter $\lambda_o$ value to another intermediate hyperparameter $\lambda_t$ value. As a result, to achieve multi-rate NIC, only a few anchor model instances may be trained and deployed for the target anchor R-D trade-off values, while the remaining intermediate R-D trade-off values of interest can be generated by the adversarial generator. Because the adversarial generator is a compact DNN, which is much smaller in terms of both storage and computation, the framework is much more efficient for multi-rate NIC than the traditional approach of training and deploying every model instance for every hyperparameter $\lambda$ of interest.

Figure 3:
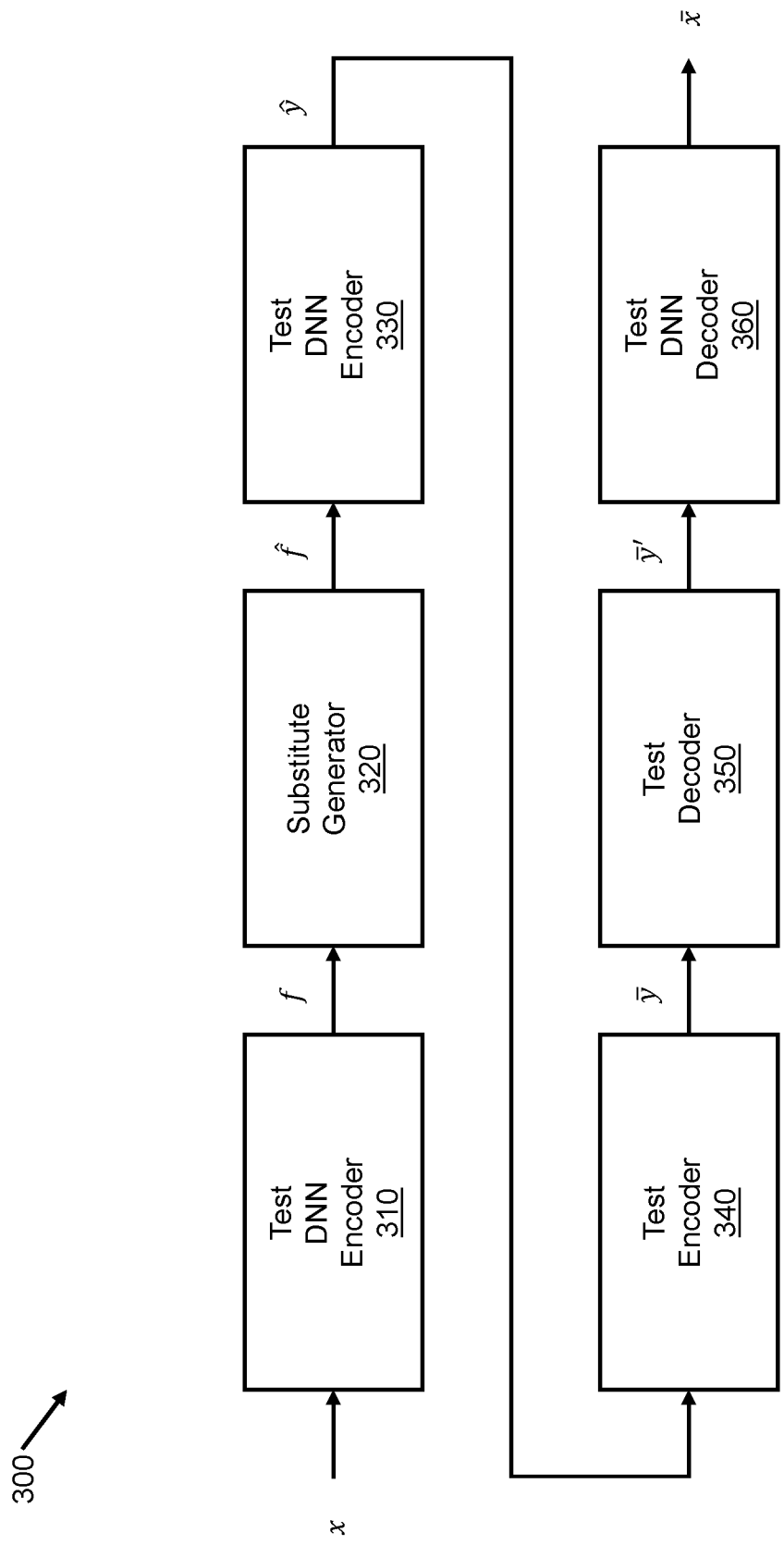
FIG. 3 is a block diagram of a test apparatus for rate-adaptive neural image compression with encoder-side adversarial generators, according to embodiments.

FIG. 3 is a block diagram of a test apparatus 300 for rate-adaptive neural image compression with encoder-side adversarial generators, according to embodiments.

As shown in FIG. 3, the test apparatus 300 includes a test DNN encoder 310, a substitute generator 320, a test DNN encoder 330, a test encoder 340, a test decoder 350 and a test DNN decoder 360.

The substitute generator 320 is an adversarial generator that is an add-on component that can be plugged into any existing NIC model. Without loss of generality, there are a test DNN encoder and a test DNN decoder from a NIC DNN, and a model instance $M_o$ is trained for a target anchor $\lambda_o$ value. This model instance $M_o$ is adapted by using a generator $G_{\lambda_o \rightarrow \lambda_t}$ to achieve the compression effects of a virtual NIC model instance $M_t$ that would have been trained for a target $\lambda_t$ value. Also, assume that the generator $G_{\lambda_o \rightarrow \lambda_t}$ will be plugged into the test DNN encoder between the i-th layer and the (i+1)-th layer. The input of the (i+1)-th layer (the output of the i-th layer) is a feature f. So the original DNN encoding process of the original NIC model can be separated into two parts, in which the input image x is passed through the DNN encoding part 1 module to compute the feature f using the test DNN encoder 310 part 1, and then f is passed through the DNN encoding part 2 module to compute the DNN encoded representation y using the test DNN encoder 330 part 2.

If the generator will be put in front of the whole test DNN encoder (i.e., i=0), the feature f is the input image x, and the test DNN encoder 330 part 2 includes the whole original test DNN encoder.

With the plugged-in adversarial generator $G_{\lambda_o \rightarrow \lambda_t}$, the feature f is passed through the substitute generator 320 to compute a substitutional feature $\hat{f}$ (a different or enhanced feature that can be used to obtain a desired compression rate), and $\hat{f}$ (instead of f) is passed through the test DNN encoder 330 part 2 to compute a DNN encoded representation $\hat{y}$ of the substitutional feature $\hat{f}$. Based on $\hat{y}$, the encoding module computes the compressed representation $\bar{y}$ using the test encoder 340. Then on the decoder side, based on $\bar{y}$, the recovered representation $\bar{y}'$ can be computed through the decoding process using the test decoder 350. Then the DNN decoding module computes the reconstructed output image $\bar{x}$ based on $\bar{y}'$ using the test DNN decoder 360. The compressed representation $\bar{y}$ and the reconstructed output image $\bar{x}$ will have a close-to-optimal R-D loss of Equation (1) with the target $\lambda_t$ value (i.e., a R-D loss that is similar to the virtual model $M_t$ that would have been trained by optimizing the R-D loss with $\lambda_t$).

In this disclosure, there are not any restrictions on the DNN network structures of the substitute generator 320. It may be much smaller than the underlying NIC model.

In embodiments, for a given target $\lambda_t$ value, the anchor model instance for anchor $\lambda_o$ to adapt to target $\lambda_t$ is selected as the one with $\lambda_o$ closest to $\lambda_t$. Also, it is worth mentioning that an embodiment of this disclosure is to have only one model instance trained over one anchor $\lambda_o$ value, and all other intermediate R-D trade-off values are simulated through different compact generators, one for each intermediate $\lambda_t$.

Figure 4:
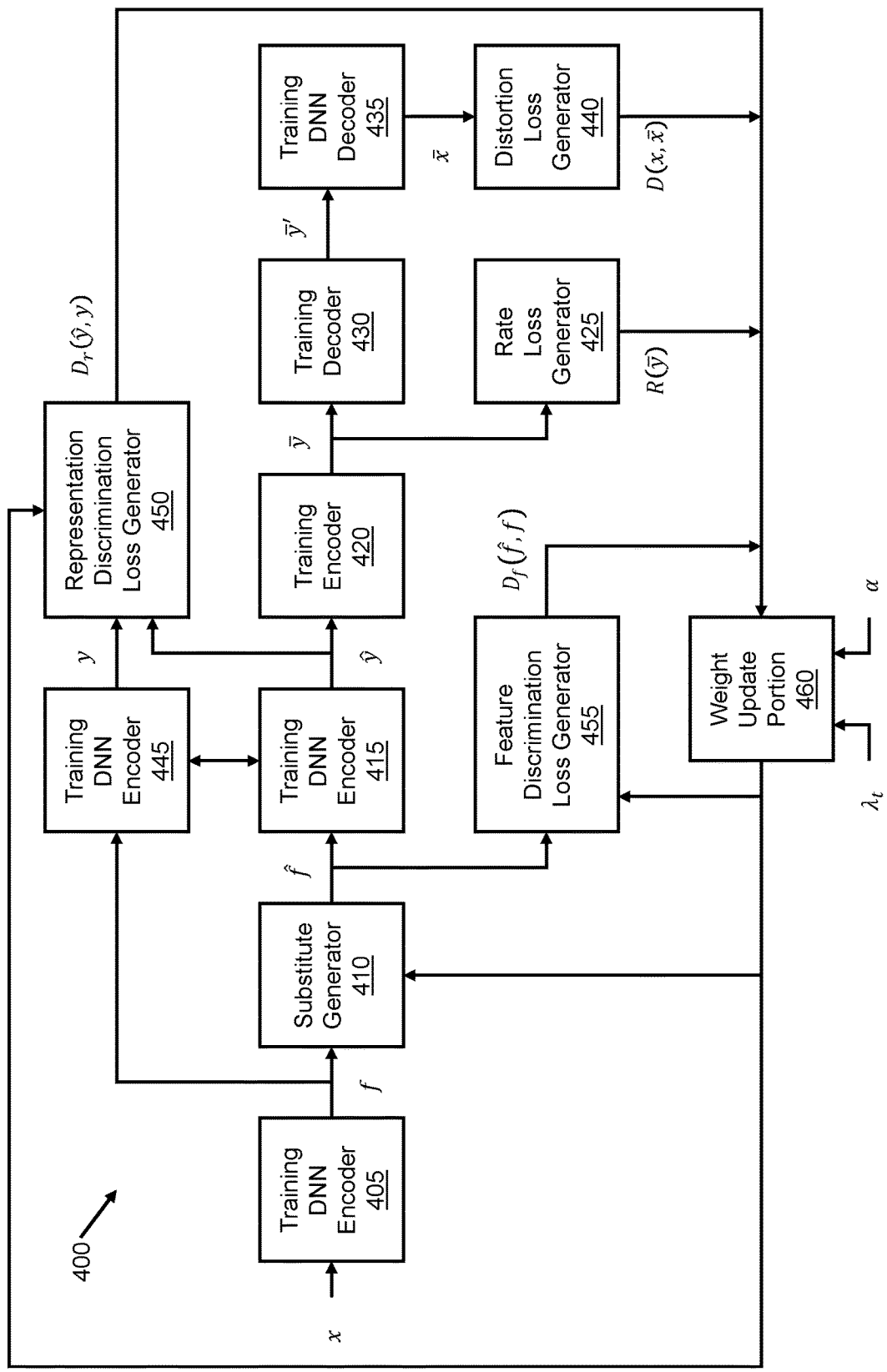
FIG. 4 is a block diagram of a training apparatus for rate-adaptive neural image compression with encoder-side adversarial generators, according to embodiments.

FIG. 4 is a block diagram of a training apparatus 400 for rate-adaptive neural image compression with encoder-side adversarial generators, according to embodiments.

As shown in FIG. 4, the training apparatus 400 includes a training DNN encoder 405, a substitute generator 410, a training DNN encoder 415, a training encoder 420, a rate loss generator 425, a training decoder 430, a training DNN decoder 435, a distortion loss generator 440, a training DNN encoder 445, a representation discrimination loss generator 450, a feature discrimination loss generator 455 and a weight update portion 460.

A NIC model is pre-trained as a model instance $M_o$ to optimize the R-D loss of Equation (1) with a target $\lambda_o$. The generator $G_{\lambda_o \rightarrow \lambda_t}$ is learned to adapt model $M_o$ for another $\lambda_t$ of interest, without retraining the underlying NIC model. Similar to the test stage, a corresponding training DNN encoder is partitioned into 2 parts: the training DNN encoder 405 part 1 and the training DNN encoder 415 part 2.

An input training image x from a training dataset S (x ∈ S) is first passed through the DNN encoding part 1 module to compute the feature f using the pre-trained training DNN encoder 405 part 1 from model instance $M_o$. Then, the substitute generator 410 uses the current generator $G_{\lambda_o \rightarrow \lambda_t}$ to compute a substitutional feature $\hat{f}$ (a different or enhanced feature that can be used to obtain a desired compression rate). Again, the substitute generator 410 is a DNN, and in embodiments, it computes a substitutional perturbation $\delta(f)$ based on input f, and the substitutional feature $\hat{f}$ is computed as $\hat{f} = f + \delta(f)$. The substitutional $\hat{f}$ is then passed through the DNN encoding part 2 module to compute the DNN encoded representation $\hat{y}$ by using the training DNN encoder 415 part 2 from the pre-trained model instance $M_o$. Then, the encoding process computes the compressed representation $\bar{y}$ using the training encoder 420. With $\bar{y}$, the rate loss generator 425 computes a rate loss $R(\bar{y})$. Then a decoding module computes the decompressed representation $\bar{y}'$ based on $\bar{y}$ by using the training decoder 430, and a DNN decoding process further generates the reconstructed output image $\bar{x}$ by using the training DNN decoder 435. The distortion loss generator 440 computes the distortion loss $D(x,\bar{e})$ between the reconstructed $\bar{x}$ and the original input image x. The rate loss $R(\bar{y})$ is related to the bit rate of the encoded representation $\bar{y}$, and in embodiments, the entropy estimation approach is used as the rate loss generator to compute the rate loss $R(\bar{y})$. Using the target $\lambda_t$ of interest, the R-D loss of Equation (1) can be computed as $L(x, \bar{x}, \bar{y}) = D(x, \bar{x}) + \lambda_t R(\bar{y})$.

At the same time, using the original feature f, the DNN encoding part 2 module can also generate an DNN encoded representation y, using the training DNN encoder 445. Based on both ŷ and y, the representation discrimination loss generator 450 computes a representation discrimination loss $D_r(\hat{y}, y)$ through a compute representation discrimination loss process. In embodiments, the representation discrimination loss generator 450 is a DNN discriminating the encoded feature representation y that are generated based on the original feature f from the representation ŷ that are generated based on the substitutional feature f̂. For example, the representation discrimination loss generator 450 can be a binary DNN classifier discriminating the representations generated from the original features as one class and the representations generated from the substitutional features as another class. Also, based on the original feature f and the substitutional feature f̂, the feature discrimination loss generator 455 can compute a feature discrimination loss $D_f(\hat{f}, f)$ through the compute feature discrimination loss process. In embodiments, the feature discrimination loss generator 455 is a DNN discriminating original feature f from the substitutional feature f̂. For example, the feature discrimination loss generator 455 can be a binary DNN classifier discriminating the original features as one class and the substitutional features as another class. Based on the feature discrimination loss $D_f(\hat{f}, f)$ and the representation discrimination loss $D_r(\hat{y}, y)$, the weight update portion 460 computes an adversarial loss $A(\hat{f}, f, \hat{y}, y)$ as ($\alpha$ as a hyperparameter):

$$A(\hat{f}, f, \hat{y}, y) = D_f(\hat{f}, f) + \alpha D_r(\hat{y}, y). \quad (2)$$

Based on $L(x, \bar{x}, \bar{y})$ and $A(\hat{f}, f, \hat{y}, y)$, the weight update portion 460 updates the weight coefficients of the trainable parts of the DNN models using the gradients through back-propagation optimization.

In embodiments, the weight coefficients of the model instance $M_o$ (including the training DNN encoder 405, 415 or 445, the training encoder 420, the training decoder 430, and training DNN decoder 435) are fixed during the above described training stage. Also, the rate loss generator 425 is pre-determined and fixed too. The weight coefficients of the substitute generator 410, the feature discrimination loss generator 455 and the representation discrimination loss generator 450 are trainable and updated through the above described training stage, by a Generative Adversarial Networks (GAN) training framework. For example, in embodiments, the gradients of the R-D loss $L(x, \bar{x}, \bar{y})$ are used to update the weight coefficients of the substitute generator 410, and the gradients of the adversarial loss $A(\hat{f}, f, \hat{y}, y)$ are used to update the weight coefficients of the feature discrimination loss generator 455 and the representation discrimination loss generator 450.

In this disclosure, there are not any restrictions on the pre-training process in which the model instance $M_o$ and the rate loss generator 425 are determined. As an example, in embodiments, a set of training images $S_{pre}$ are used in the pre-training process, which can be the same or different from the training data set S. For each image $x \in S_{pre}$, the same forward inference computation is conducted through DNN encoding, encoding, decoding, DNN decoding to compute the encoded representation $\bar{y}$ and the reconstructed $\bar{x}$. Then the distortion loss $D(x, \bar{x})$ and the rate loss $R(\bar{y})$ can be computed. Then, given a pre-train hyperparameter $\lambda_{pre}$, the overall R-D loss $L(x, \bar{x}, \bar{y})$ can be computed based on Equation (1), whose gradients are used to update the weights of the training DNN encoder 405, 415 or 445, the training encoder 420, the training decoder 430, the training DNN decoder 435, and the rate loss generator 425 through back-propagation.

It is also worth mentioning that in embodiments, the training DNN encoder 405 part 1, the training DNN encoder 415 part 2, and the training DNN decoder 435 are the same as the corresponding test DNN encoder 310 part 1, the test DNN encoder 330 part 2, and the test DNN decoder 360. While the training encoder 420 and the training decoder 430 are different from the corresponding test encoder 340 and test decoder 350. For example, the test encoder 340 and test decoder 350 include a general test quantizer and test entropy encoder, and a general test entropy decoder and test dequantizer, respectively. Each of the training encoder 420 and training decoder 430 uses a statistic sampler to approximate the effect of the test quantizer and the test dequantizer, respectively. The entropy encoder and decoder are skipped in the training stage.

Figure 5:
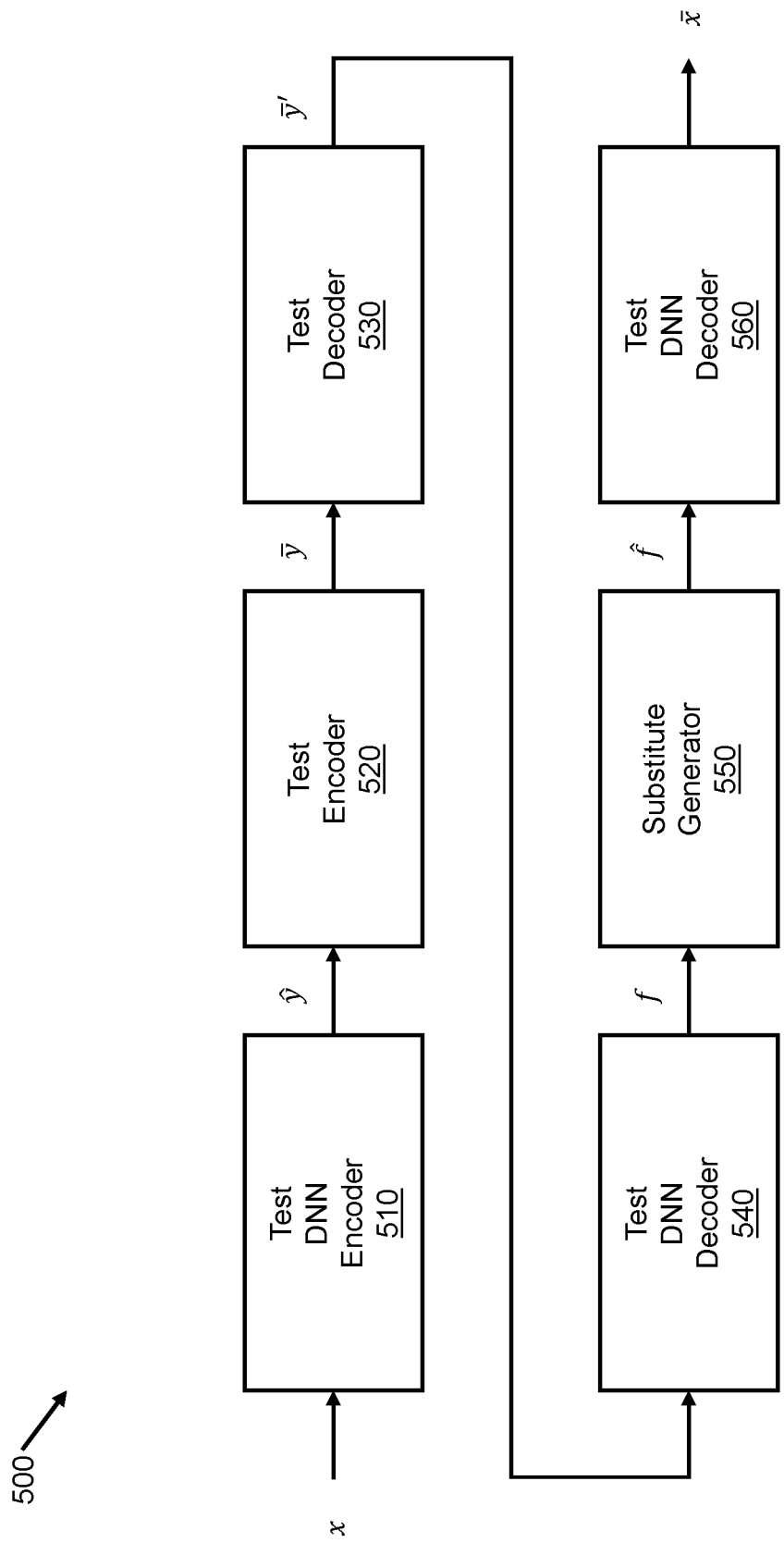
FIG. 5 is a block diagram of a test apparatus for rate-adaptive neural image compression with decoder-side adversarial generators, according to embodiments.

FIG. 5 is a block diagram of a test apparatus 500 for rate-adaptive neural image compression with decoder-side adversarial generators, according to embodiments.

As shown in FIG. 5, the test apparatus 500 includes a test DNN encoder 510, a test encoder 520, a test decoder 530, a test DNN decoder 540, a substitute generator 550 and a test DNN decoder 560.

The substitute generator 550 is an add-on component that can be plugged into any existing NIC model. Without loss of generality, there are a test DNN encoder and a test DNN decoder from a NIC DNN, and a model instance $M_o$ is trained for a target anchor $\lambda_o$ value. This model instance $M_o$ is adapted by using a generator $G_{\lambda_o \to \lambda_t}$ to achieve the compression effects of a virtual NIC model instance $M_t$ that would have been trained for a target $\lambda_t$ value. Also, assume that the generator $G_{\lambda_o \to \lambda_t}$ will be plugged into the test DNN decoder between the 1-th layer and the (i+1)-th layer. The input of the (i+1)-th layer (the output of the i-th layer) is a feature f So the original DNN decoding process of the original NIC model can be separated into two parts, in which the input recovered representation $\bar{y}'$ is passed through the DNN decoding part 1 module to compute the feature fusing the test DNN decoder 540 part 1, and then f is passed through the DNN decoding part 2 module to compute the reconstructed $\bar{x}'$ using the test DNN decoder 560 part 2.

If the generator will be put in front of the whole test DNN decoder (i.e., i=0), the feature f is the input recovered representation $\bar{y}'$, and the test DNN decoder 560 part 2 includes the whole original test DNN decoder.

So, given an input image x, the DNN encoding process uses the test DNN encoder 510 to compute the DNN encoded representation y, which is further encoded in the encoding process through the test encoder 520 to generate the compressed representation $\bar{y}$. Then on the decoder side, the compressed representation $\bar{y}$ is decoded by the test decoder 530 to generate the recovered representation $\bar{y}'$ in the decoding module. Then the DNN decoding part 1 module computes the feature f based on $\bar{y}'$ using the test DNN decoder 540 part 1. With the plugged-in adversarial generator $G_{\lambda_o \to \lambda_t}$, the feature f is passed through the substitute generator 550 to compute the substitutional feature $\hat{f}$, and $\hat{f}$ (instead of f) is passed through the DNN decoding part 2 module to compute the reconstructed output image $\bar{x}$ by the test DNN decoder 560 part 2. The compressed representation $\bar{y}$ and the reconstructed output image $\bar{x}$ will have a close-to-optimal R-D loss of Equation (1) with the target $\lambda_t$ value (i.e., a R-D loss that is similar to the virtual model $M_t$ that would have been trained by optimizing the R-D loss with $\lambda_t$).

In this disclosure, there are not any restrictions on the DNN network structures of the generator. It may be much smaller than the underlying NIC model.

In embodiments, for a given target $\lambda_t$ value, the anchor model instance for anchor $\lambda_o$ to adapt to target $\lambda_t$ is selected as the one with $\lambda_o$ closest to $\lambda_t$. Also, it is worth mentioning that an embodiment of this disclosure is to have only one model instance trained over one anchor $\lambda_o$ value, and all other intermediate R-D trade-off values are simulated through different compact generators, one for each intermediate $\lambda_t$.

Figure 6:
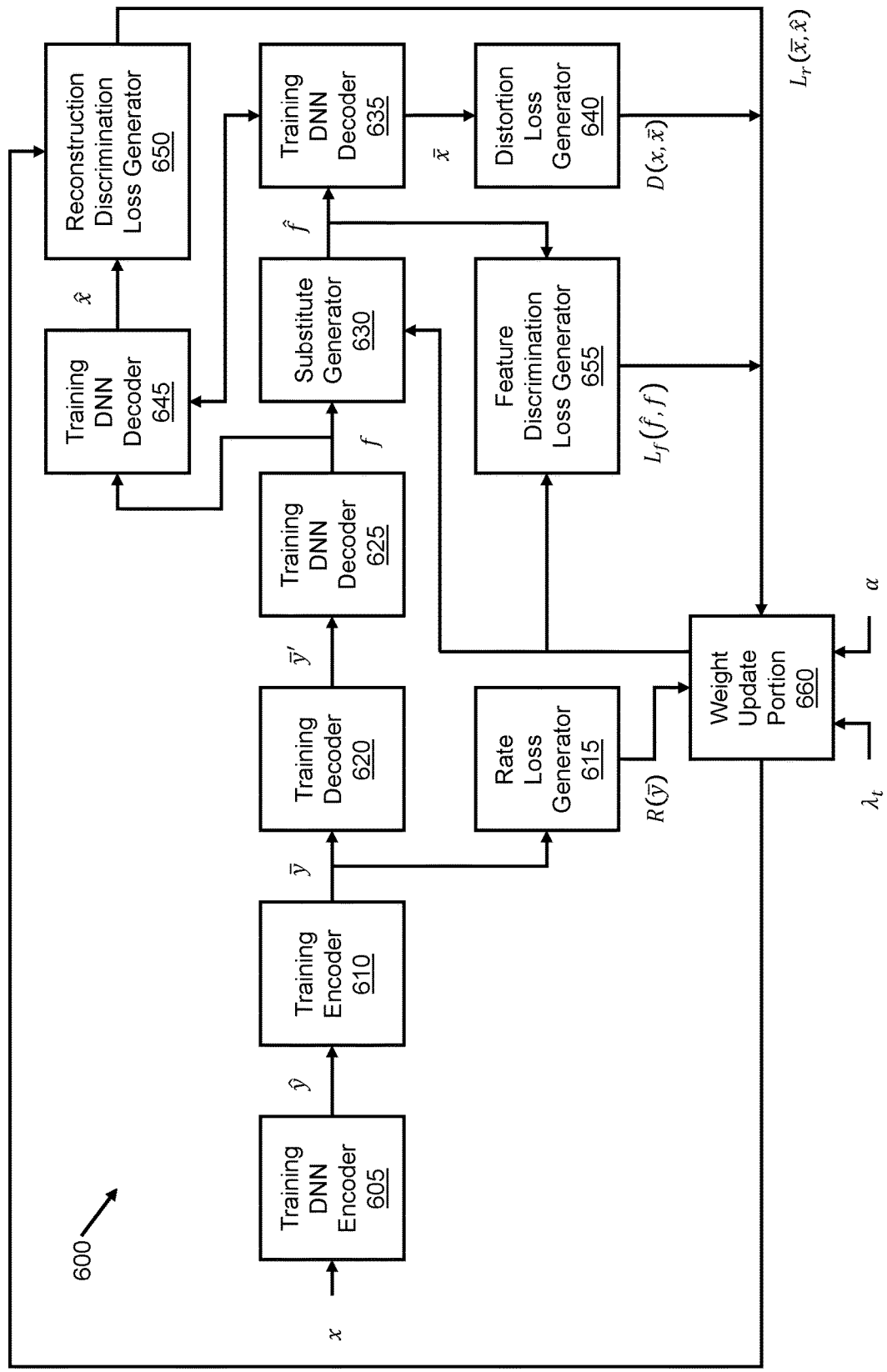
FIG. 6 is a block diagram of a training apparatus for rate-adaptive neural image compression with decoder-side adversarial generators, according to embodiments.

FIG. 6 is a block diagram of a training apparatus 600 for rate-adaptive neural image compression with decoder-side adversarial generators, according to embodiments.

As shown in FIG. 6, the training apparatus 600 includes a training DNN encoder 605, a training encoder 610, a rate loss generator 615, a training decoder 620, a training DNN decoder 625, a substitute generator 630, a training DNN decoder 635, a distortion loss generator 640, a training DNN decoder 645, a reconstruction discrimination loss generator 650, a feature discrimination loss generator 655 and a weight update portion 660.

A NIC model is pre-trained as a model instance $M_o$ to optimize the R-D loss of Equation (1) with a target $\lambda_o$. The generator $G_{\lambda_o \to \lambda_t}$ is learned to adapt model $M_o$ for another $\lambda_t$ of interest, without retraining the NIC model. Similar to the test stage, the corresponding training DNN decoder is partitioned into 2 parts: the training DNN decoder 625 part 1 and the training DNN decoder 635 part 2.

An input training image x from a training dataset S (x ∈ S) is first passed through the DNN encoding module to compute the DNN encoded representation $\hat{y}$ based on the training DNN encoder 605. Then the encoding process computes the compressed representation $\bar{y}$ using the training encoder 610. Based on $\bar{y}$, the rate loss generator 615 computes a rate loss $R(\bar{y})$. Then on the decoder side, a decoding module computes the decompressed representation $\bar{y}'$ based on $\bar{y}$ by using the training decoder 620. The decompressed $\bar{y}'$ is then passed through the DNN decoding part 1 module to compute a feature f using the pre-trained training DNN decoder 625 part 1 from model instance $M_o$. Then the substitute generator 630 uses the current generator $G_{\lambda_o \to \lambda_t}$ to compute a substitutional feature $\hat{f}$. Again, the substitute generator 630 is a DNN, and in embodiments, it computes a substitutional perturbation $\delta(f)$ based on input f, and the substitutional feature $\hat{f}$ is computed as $\hat{f} = f + \delta(f)$. The substitutional $\hat{f}$ is then passed through the DNN decoding part 2 module to compute the reconstructed output image $\bar{x}$ by using the training DNN decoder 635 part 2 from the pre-trained model instance $M_o$. The distortion loss generator 640 computes the distortion loss $D(x, \bar{x})$ between the reconstructed $\bar{x}$ and the original input image x. The rate loss $R(\bar{y})$ is related to the bit rate of the encoded representation $\bar{y}$, and in embodiments, the entropy estimation approach is used as the rate loss generator 615 to compute the rate loss $R(\bar{y})$. Using the target $\lambda_t$ of interest, the R-D loss of Equation (1) can be computed as $L(x, \bar{x}, \bar{y}) = D(x, \bar{x}) + \lambda_t R(\bar{y})$.

At the same time, using the original feature f, the training DNN decoder 645 part 2 module can also compute a reconstructed output image $\hat{x}$. Based on both $\hat{x}$ and $\bar{x}$, the reconstruction discrimination loss generator 650 computes a reconstruction discrimination loss $L_r(\hat{x}, \bar{x})$ through a compute reconstruction discrimination loss process. In embodiments, the reconstruction discrimination loss generator 650 is a DNN discriminating the reconstructed output image $\hat{x}$ that are generated based on the original feature f from the reconstructed output image $\bar{x}$ that are generated based on the substitutional feature $\hat{f}$. For example, the reconstruction discrimination loss generator 650 can be a binary DNN classifier discriminating the reconstructed output images generated from the original features as one class and the reconstructed output images generated from the substitutional features as another class. Also, based on the original feature f and the substitutional feature $\hat{f}$, the feature discrimination loss generator 655 can compute a feature discrimination loss $L_f(\hat{f}, f)$ through the compute feature discrimination loss process. In embodiments, the feature discrimination loss generator 655 is a DNN discriminating original feature f from the substitutional feature $\hat{f}$. For example, the feature discrimination loss generator 655 can be a binary DNN classifier discriminating the original features as one class and the substitutional features as another class. Based on the feature discrimination loss $L_f(\hat{f}, f)$ and the reconstruction discrimination loss $L_r(\hat{x}, \bar{x})$, the weight update portion 660 computes an adversarial loss $A(\hat{f}, f, \hat{x}, \bar{x})$ as ($\alpha$ as a hyperparameter):

$$A(\hat{f}, f, \hat{x}, \bar{x}) = L_f(\hat{f}, f) + \alpha L_r(\hat{x}, \bar{x}). \quad (3)$$

Based on $L(x, \bar{x}, \bar{y})$ and $A(\hat{f}, f, \hat{x}, \bar{x})$, the weight update portion 660 updates the weight coefficients of the trainable parts of the DNN models using the gradients through back-propagation optimization.

In embodiments, the weight coefficients of the model instance $M_o$ (including the training DNN encoder 605, the training encoder 610, the training decoder 620, and training DNN decoder 625, 635 or 645) are fixed during the above described training stage. Also, the rate loss generator 615 is pre-determined and fixed too. The weight coefficients of the substitute generator 630, the feature discrimination loss generator 655 and the reconstruction discrimination loss generator 650 are trainable and updated through the above-described training stage, by a GAN training framework. For example, in embodiments, the gradients of the R-D loss $L(x, \bar{x}, \bar{y})$ are used to update the weight coefficients of the substitute generator 630, and the gradients of the adversarial loss $A(\hat{f}, f, \hat{y}, y)$ are used to update the weight coefficients of the feature discrimination loss generator 655 and the reconstruction discrimination loss generator 650.

In this disclosure, there are not any restrictions on the pre-training process in which the model instance $M_o$ and the rate loss generator 615 are determined. As an example, in embodiments, a set of training images $S_{pre}$ are used in the pre-training process, which can be the same or different from the training data set S. For each image x ∈ $S_{pre}$, the same forward inference computation is conducted through DNN encoding, encoding, decoding, DNN decoding to compute the encoded representation $\bar{y}$ and the reconstructed $\bar{x}$. Then the distortion loss $D(x, \bar{x})$ and the rate loss $R(\bar{y})$ can be computed. Then, given a pre-train hyperparameter $\lambda_{pre}$, the overall R-D loss $L(x, \bar{x}, \bar{y})$ can be computed based on Equation (1), whose gradients are used to update the weights of the training DNN encoder 605, the training encoder 610, the training decoder 620, the training DNN decoder 625, 635 or 645, and the rate loss generator 615 through back-propagation.

It is also worth mentioning that in embodiments, the training DNN encoder 605, the training DNN decoder 625 part 1, and the training DNN decoder 635 part 2 are the same as the corresponding test DNN encoder 510, the test DNN decoder 540 part 1, and the test DNN decoder 560 part 2. While the training encoder 610 and the training decoder 620 are different from the corresponding test encoder 520 and the test decoder 530. For example, the test encoder 520 and test decoder 530 include a general test quantizer and test entropy encoder, and a general test entropy decoder and test dequantizer, respectively. Each of the training encoder 610 and training decoder 620 uses a statistic sampler to approximate the effect of the test quantizer and the test dequantizer, respectively. The entropy encoder and decoder are skipped in the training stage.

FIGS. 7A, 7B and 7C are block diagrams of test apparatuses 700A, 700B and 700C for rate-adaptive neural image compression with attention-based adversarial generators, according to embodiments.

The attention-based adversarial generator is an add-on component that can be plugged into any existing NIC model, either on the encoder side (FIG. 7A) or on the decoder side (FIGS. 7B and 7C), which uses an attention map generated by an attention model to automatically focus on the important information during the R-D trade-off adaptation. Because the attention-based adversarial generator uses the output of the attention model, the attention model needs to be placed before the generator, on either the encoder side (FIGS. 7A and 7B) or the decoder side (FIG. 7C).

Without loss of generality, there are a test DNN encoder and a test DNN decoder from a NIC DNN, and a model instance $M_o$ is trained for a target anchor $\lambda_o$ value. This model instance $M_o$ is adapted by using a generator $G_{\lambda_o \to \lambda_t}$ to achieve the compression effects of a virtual NIC model instance $M_t$ that would have been trained for a target $\lambda_t$ value. Also, assume that the generator $G_{\lambda_o \to \lambda_t}$ will be plugged into either the test DNN encoder between the i-th layer and the (i+1)-th layer, or the test DNN decoder between the i-th layer and the (i+1)-th layer. The input of the (i+1)-th layer (the output of the i-th layer) is a feature f.

As shown in FIG. 7A, the test apparatus 700A includes a test DNN encoder 705, a substitute generator 710, a test DNN encoder 715, a test encoder 720, a test decoder 725, a test DNN decoder 730, and an attention generator 735.

When the substitute generator 710 is placed on the encoder side, the original DNN encoding process of the original NIC model can be separated into two parts, in which the input image x is passed through the DNN encoding part 1 module to compute the feature f using the test DNN encoder 705 part 1, and then f is passed through the DNN encoding part 2 module to compute the DNN encoded representation y using the test DNN encoder 715 part 2. If the substitute generator 710 will be put in front of the whole test DNN encoder (i.e., i=0), the feature f is the input image x, and the test DNN encoder 715 part 2 includes the whole original test DNN encoder.

As shown in FIGS. 7B and 7C, the test apparatus 700B or 700C includes a test DNN encoder 740, test encoder 745, a test decoder 750, a test DNN decoder 755, a substitute generator 760 and a test DNN decoder 765. The test apparatus 700B of FIG. 7B includes an attention generator 770, and the test apparatus 700C of FIG. 7C includes an attention generator 775.

When the substitute generator 760 is placed on the decoder side, the original DNN decoding process of the original NIC model can be separated into two parts, in which the input recovered representation $\bar{y}'$ is passed through the DNN decoding part 1 module to compute the feature f using the test DNN decoder 755 part 1, and then f is passed through the DNN decoding part 2 module to compute reconstructed $\bar{x}$ using the test DNN decoder 765 part 2. If the substitute generator 760 will be put in front of the whole test DNN decoder (i.e., i=0), the feature f is the input recovered representation $\bar{y}'$, and the test DNN decoder 765 part 2 includes the whole original test DNN decoder.

Referring to FIGS. 7A-7C, without loss of generality, there is an attention model, which is a DNN and will be plugged onto the test DNN encoder between the j-th layer and the (j+1)-th layer, or the test DNN decoder between the j-th layer and the (j+1)-th layer, j≤i. The input of the (j+1)-th layer (the output of the j-th layer) is a feature a, and the attention generator generates an attention map $\bar{a}$ based on a. So, when the attention model is put in front of the whole test DNN encoder (i.e., j=0), the feature a is the input image x. When the attention model is put in front of the whole test DNN decoder, the feature a is the input recovered representation $\bar{y}'$.

Referring to FIG. 7A, given an input image x, for the configuration in which the generator $G_{\lambda_o \to \lambda_t}$ is put on the encoder side, x is passed through the DNN encoding part 1 module to compute the feature f using the test DNN encoder 705 part 1. Also, the feature a as the output of the j-th layer and the input of the (j+1)-th layer of the test DNN encoder 705 part 1 is passed through the attention generator 735 to generate the attention map $\bar{a}$, by using the attention model. Then the feature f and the attention map $\bar{a}$ are passed through the substitute generator 710 to compute a substitutional feature $\hat{f}$, and $\hat{f}$ (instead of f) is passed through the DNN encoding part 2 module to compute a DNN encoded representation $\hat{y}$ by the test DNN encoder 715 part 2. Based on $\hat{y}$, the encoding module computes the compressed representation $\bar{y}$ using the test encoder 720. Then on the decoder side, based on $\bar{y}$, the recovered representation $\bar{y}'$ can be computed through the decoding process using the test decoder 725. Then the DNN decoding module computes the reconstructed output image $\bar{x}'$ based on $\bar{y}'$ using the test DNN decoder 730. The compressed representation $\bar{y}$ and the reconstructed output image $\bar{x}'$ will have a close-to-optimal R-D loss of Equation (1) with the target $\lambda_t$ value (i.e., a R-D loss that is similar to the virtual model $M_t$ that would have been trained by optimizing the R-D loss with $\lambda_t$).

Referring to FIGS. 7B and 7C, for the configuration in which the generator $G_{\lambda_o \to \lambda_t}$ is put on the decoder side, with input image x, the DNN encoding process uses the test DNN encoder 740 to compute the DNN encoded representation y, which is further encoded in the encoding process through the test encoder 745 to generate the compressed representation $\bar{y}$. Then on the decoder side, the compressed representation $\bar{y}$ is decoded by the test decoder 750 to generate the recovered $\bar{y}'$ in the decoding module. Then the DNN decoding part 1 module computes the feature f based on $\bar{y}'$ using the test DNN decoder 755 part 1.

For the configuration described in FIG. 7B, the feature a as the output of the j-th layer and the input of the (j+1)-th layer of the test DNN encoder 740 is passed through the attention generator 770 to generate the attention map $\bar{a}$, by using the attention model.

For the configuration described in FIG. 7C, the feature a as the output of the j-th layer and the input of the (j+1)-th layer of the test DNN decoder 755 part 1 is passed through the attention generator 775 to generate the attention map $\bar{a}$, by using the attention model.

Then, with the plugged-in adversarial generator $G_{\lambda_o \to \lambda_t}$, the feature f and the attention map $\bar{a}$ are passed through the substitute generator 760 to compute the substitutional feature $\hat{f}$, and $\hat{f}$ (instead of f) is passed through the DNN decoding part 2 module to compute the reconstructed output image $\bar{x}$ by the test DNN decoder 765 part 2. The compressed representation $\bar{y}$ and the reconstructed output image $\bar{x}$ will have a close-to-optimal R-D loss of Equation (1) with the target $\lambda_t$ value (i.e., a R-D loss that is similar to the virtual model $M_t$ that would have been trained by optimizing the R-D loss with $\lambda_t$).

In this disclosure, there are not any restrictions on the DNN network structures of the attention model. In embodiments, the attention map $\bar{a}$ will have the same shape as the feature f, and large values of the attention map means the corresponding features in f are more important, and vice versa.

In this disclosure, there are not any restrictions on the DNN network structures of the substitute generator 710 or 760. In embodiments, the substitute generator 710 or 760 is much smaller than the underlying NIC model, and the input feature f and the input attention map a are combined, e.g., by element-wise multiplication, to generate an attention-masked input to pass through the generator DNN.

In embodiments, for a given target $\lambda_t$ value, the anchor model instance for anchor $\lambda_o$ to adapt to target $\lambda_t$ is selected as the one with $\lambda_o$ closest to $\lambda_t$. Also, it is worth mentioning that an embodiment of this disclosure is to have only one model instance trained over one anchor $\lambda_o$ value, and all other intermediate R-D trade-off values are simulated through different compact generators, one for each intermediate $\lambda_t$.

Figure 8A:
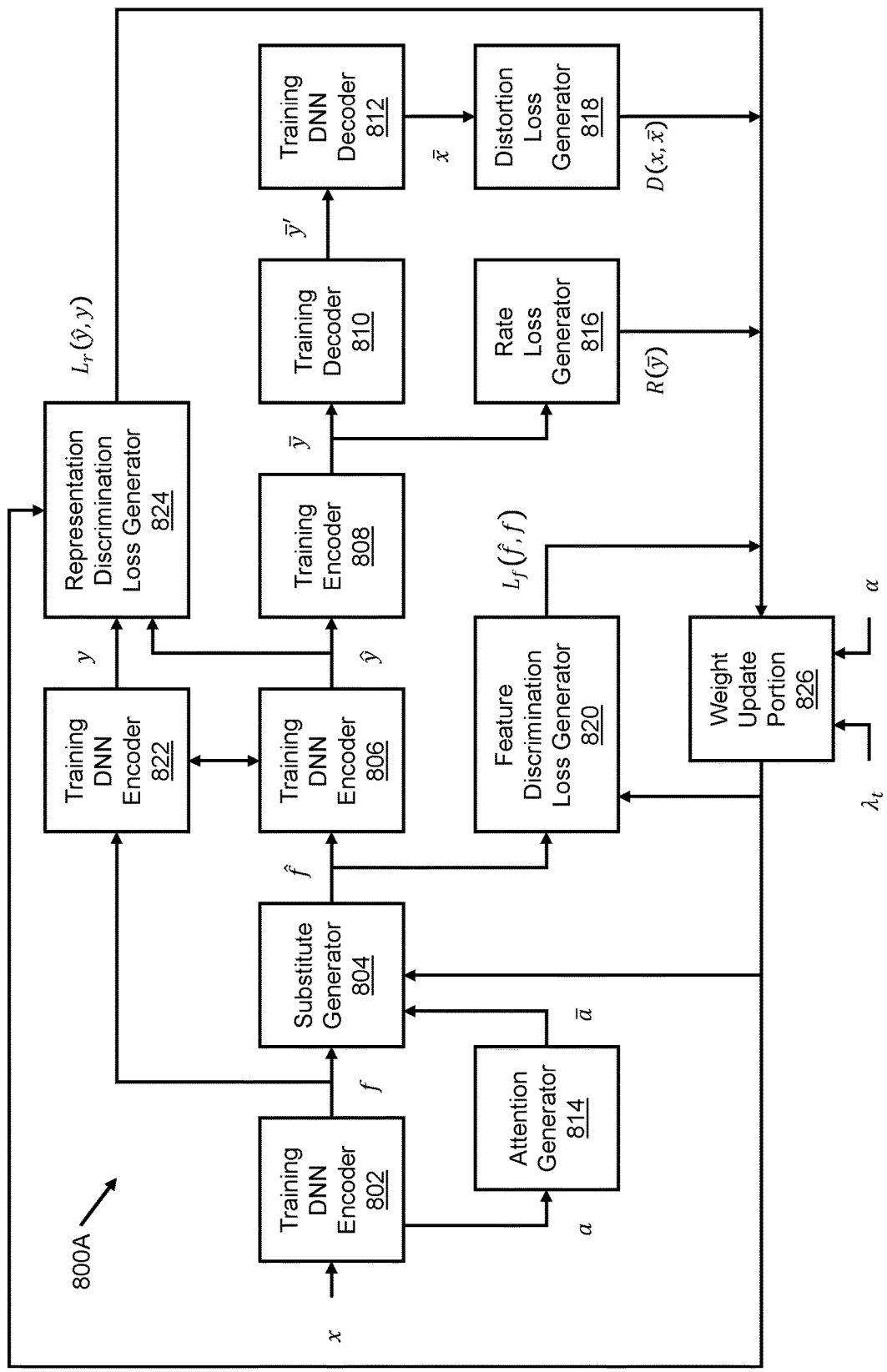
FIGS. 8A, 8B and 8C are block diagrams of training apparatuses for rate-adaptive neural image compression with attention-based adversarial generators, according to embodiments.
Figure 8B:
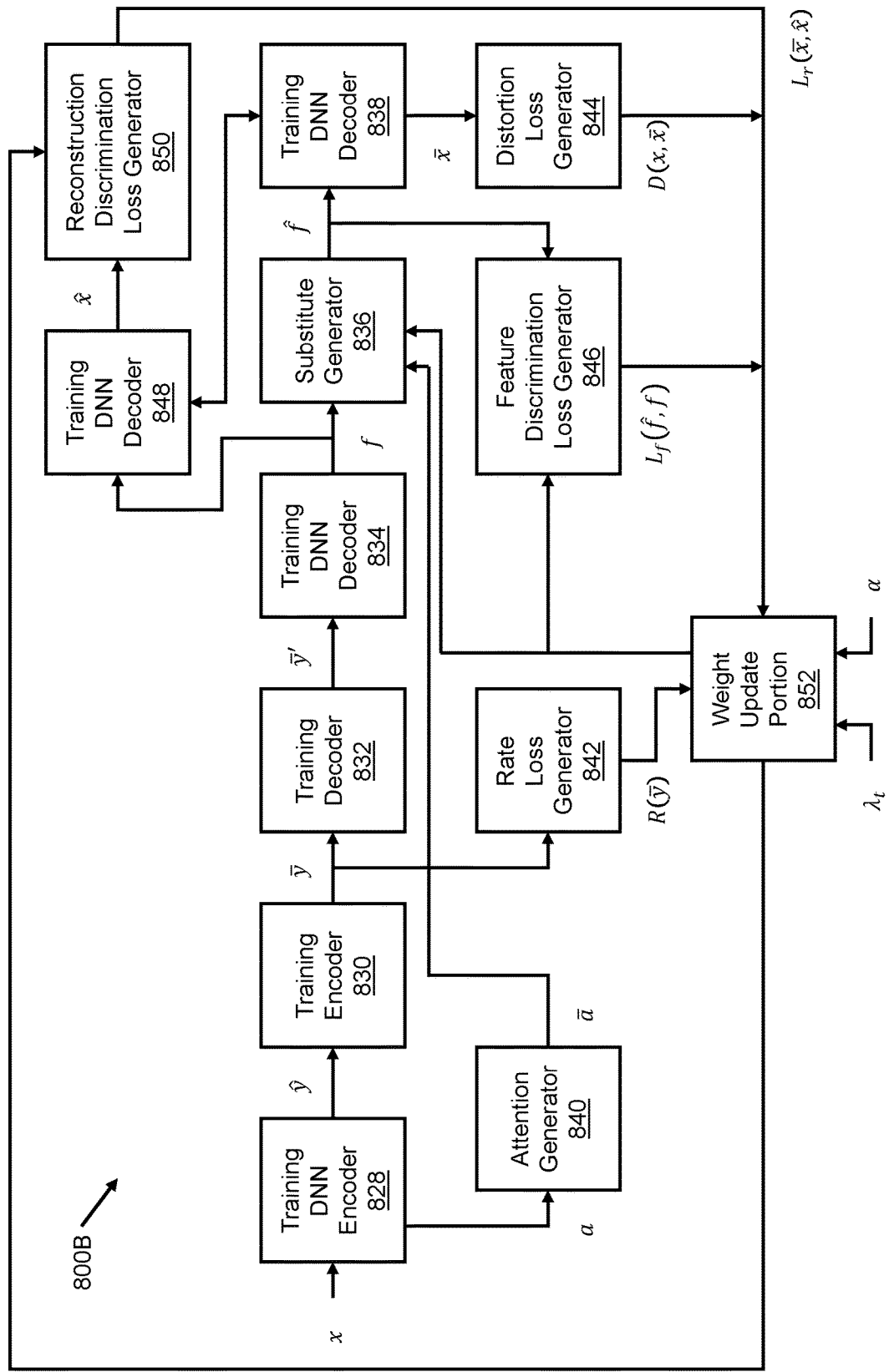
Figure 8C:
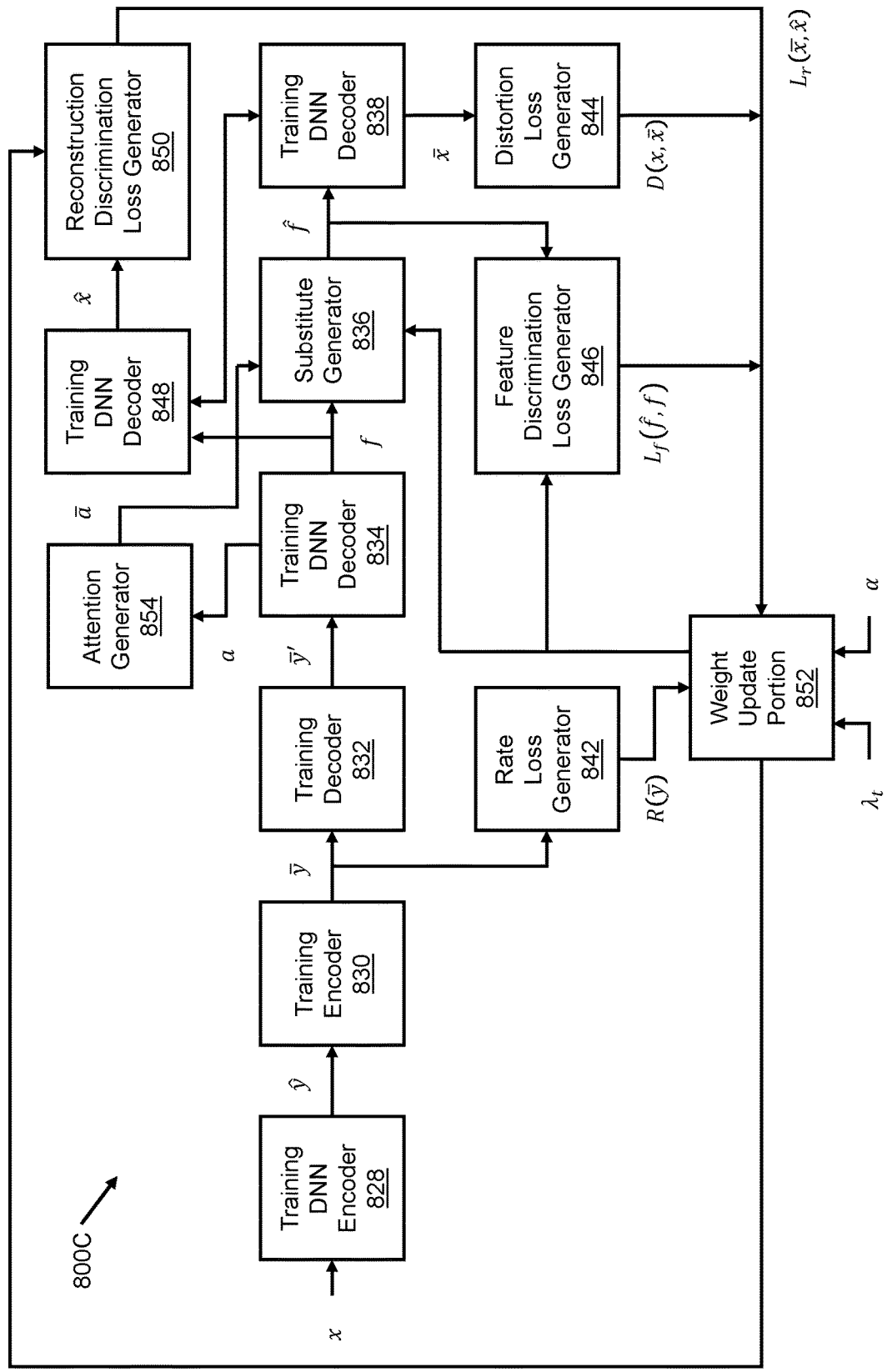

FIG. 8A, 8B and 8C are block diagrams of training apparatuses 800A, 800B and 800C for rate-adaptive neural image compression with attention-based adversarial generators, according to embodiments.

There is a NIC model that is pre-trained as a model instance $M_o$ to optimize the R-D loss of Equation (1) with a target $\lambda_o$. The generator $G_{\lambda_o \to \lambda_t}$ is learned to adapt model $M_o$ for another $\lambda_t$ of interest, without retraining the underlying NIC model. Similar to the corresponding test stage, FIG. 8A gives the workflow when the generator is put on the encoder side, in which the corresponding training DNN encoder is partitioned into 2 parts: a training DNN encoder 802 part 1 and a training DNN encoder 806 part 2. FIGS. 8B and 8C give the workflow when the generator is put on the decoder side, in which the corresponding training DNN decoder is partitioned into 2 parts: a training DNN decoder 834 part 1 and a training DNN decoder 838 part 2.

As shown in FIG. 8A, the training apparatus 800A includes the training DNN encoder 802, a substitute generator 804, the training DNN encoder 806, a training encoder 808, a training decoder 810, a training DNN decoder 812, an attention generator 814, a rate loss generator 816, a distortion loss generator 818, a feature discrimination loss generator 820, a training DNN encoder 822, a representation discrimination loss generator 824 and a weight update portion 826.

When the generator is put on the encoder side, given an input training image x from a training dataset S (x∈S), it is first passed through the DNN encoding part 1 module to compute the feature f using the pre-trained training DNN encoder 802 part 1 from model instance $M_o$. Also, the feature a as the output of the j-th layer and the input of the (j+1)-th layer of the training DNN encoder 802 part 1 is passed through the attention generator 814 to generate the attention map $\bar{a}$, by using the attention model. Then the feature f and the attention map $\bar{a}$ are passed through the substitute generator 804 to compute a substitutional feature $\hat{f}$ using the current generator $G_{\lambda_o \to \lambda_t}$. In embodiments, the attention map $\bar{a}$ and the feature f have the same shape, and they are combined by for instance element-wise multiplication to generate an attention-masked input $\tilde{f}$ to pass through the substitute generator 804, which computes a substitutional perturbation $\delta(\tilde{f})$ based on the attention-masked input. The substitutional feature $\hat{f}$ is computed as $\hat{f}=\tilde{f}+\delta(\tilde{f})$. The substitutional $\hat{f}$ is then passed through the DNN encoding part 2 module to compute the DNN encoded representation $\hat{y}$ by using the training DNN encoder 806 part 2 from the pre-trained model instance $M_o$. Then the encoding process computes the compressed representation $\bar{y}$ using the training encoder 808. With $\bar{y}$, the rate loss generator 816 computes a rate loss $R(\bar{y})$. Then a decoding module computes the decompressed $\bar{y}'$ based on $\bar{y}$ b y using the training decoder 810, and a DNN decoding process further generates the reconstructed $\bar{x}$ by using the training DNN decoder 812. The distortion loss generator 818 computes the distortion loss $D(x, \bar{x})$ between the reconstructed $\bar{x}$ and the original input image x. The rate loss $R(\bar{y})$ is related to the bit rate of the encoded representation $\bar{y}$, and in embodiments, the entropy estimation approach is used by the rate loss generator 816 to compute the rate loss $R(\bar{y})$. Using the target $\lambda_t$ of interest, the R-D loss of Equation (1) can be computed as $L(x, \bar{x}, \bar{y})=D(x, \bar{x})+\lambda_t R(\bar{y})$.

As shown in FIGS. 8B and 8C, the training apparatus 800B or 800C includes a training DNN encoder 828, a training encoder 830, a training decoder 832, the training DNN decoder 834, a substitute generator 836, the training DNN decoder 838, a rate loss generator 842, a distortion loss generator 844, a feature discrimination loss generator 846, a training DNN decoder 848, a reconstruction discrimination loss generator 850 and a weight update portion 852. The training apparatus 800B of FIG. 8B includes an attention generator 840, and the training apparatus 800C of FIG. 8C includes an attention generator 854.

Referring to FIGS. 8B and 8C, when the generator is put on the decoder side, an input training image x from a training dataset S (x ∈ S) is first passed through the DNN encoding module to compute the DNN encoded representation y based on the training DNN encoder 828. Then the encoding process computes the compressed representation $\bar{y}$ using the training encoder 830. Based on $\bar{y}$, the rate loss generator 842 computes a rate loss $R(\bar{y})$. Then on the decoder side, a decoding module computes the decompressed $\bar{y}'$ based on $\bar{y}$ by using the training decoder 832. The decompressed $\bar{y}'$ is then passed through the DNN decoding part 1 module to compute the feature f using the pre-trained training DNN decoder 834 part 1 from model instance $M_o$.

For the configuration described in FIG. 8B, the feature a as the output of the j-th layer and the input of the (j+1)-th layer of the training DNN encoder 828 is passed through the attention generator 840 to generate the attention map $\bar{a}$, by using the attention model. With the plugged-in adversarial generator $G_{\lambda_o \to \lambda_t}$, the feature f and the attention map $\bar{a}$ are passed through the substitute generator 836 to compute the substitutional feature $\hat{f}$. Similar to FIG. 8A, in embodiments, the attention map $\bar{a}$ and the feature f have the same shape, and they are combined by for instance element-wise multiplication to generate an attention-masked input $\bar{f}$ to pass through the substitute generator 836, which computes a substitutional perturbation $\delta(\bar{f})$ based on the attention-masked input. The substitutional feature $\hat{f}$ is computed as $\hat{f}=\bar{f}+\delta(\bar{f})$. The substitutional $\hat{f}$ is then passed through the DNN decoding part 2 module to compute the reconstructed output image $\bar{x}$ by using the training DNN decoder 838 part 2 from the pre-trained model instance $M_o$. The distortion loss generator 844 computes the distortion loss $D(x, \bar{x})$ between the reconstructed $\bar{x}$ and the original input image x. The rate loss $R(\bar{y})$ is related to the bit rate of the encoded representation $\bar{y}$, and in embodiments, the entropy estimation approach is used by the rate loss generator 842 to compute the rate loss $R(\bar{y})$. Using the target $\lambda_t$ of interest, the R-D loss of Equation (1) can be computed as $L(x, \bar{x}, \bar{y})=D(x, \bar{x})+\lambda_t R(\bar{y})$.

For the configuration of FIG. 8C, the feature a as the output of the j-th layer and the input of the (j+1)-th layer of the training DNN decoder 834 part 1 is passed through the attention generator to generate the attention map $\bar{a}$, by using the attention model. Similar to the above case of FIG. 8B, the feature f and the attention map $\bar{a}$ are passed through the substitute generator 836 to compute the substitutional feature $\hat{f}$, in which in embodiments, the attention map $\bar{a}$ and the feature f have the same shape, and they are combined by for instance element-wise multiplication to generate an attention-masked input $\bar{f}$ to pass through the substitute generator 836. The substitute generator 836 computes a substitutional perturbation $\delta(\bar{f})$ based on the attention-masked input, and the substitutional feature $\hat{f}$ is computed as $\hat{f}=\bar{f}+\delta(\bar{f})$ The substitutional $\hat{f}$ is then passed through the DNN decoding part 2 module to compute the reconstructed output image $\bar{x}$ by using the training DNN decoder 838 part 2 from the pre-trained model instance $M_o$. The distortion loss generator 844 computes the distortion loss $D(x, \bar{x})$ between the reconstructed $\bar{x}$ and the original input image x. The rate loss $R(\bar{y})$ is related to the bit rate of the encoded representation $\bar{y}$, and in embodiments, the entropy estimation approach is used by the rate loss generator 842 to compute the rate loss $R(\bar{y})$. Using the target $\lambda_t$ of interest, the R-D loss of Equation (1) can be computed as $L(x, \bar{x}, \bar{y})=D(x, \bar{x})+\lambda_t R(\bar{y})$.

Referring to FIGS. 8A-8C, at the same time, based on the original feature f and the substitutional feature $\hat{f}$, the feature discrimination loss generator 820 or 846 can compute a feature discrimination loss $L_f(\hat{f}, f)$ through the compute feature discrimination loss process. In embodiments, the feature discrimination loss generator 820 or 846 is a DNN discriminating original feature f from the substitutional feature $\hat{f}$. For example, the feature discrimination loss generator 820 or 846 can be a binary DNN classifier discriminating the original attention-masked features as one class and the substitutional features as another class.

Also, when the generator is on the encoder side as in FIG. 8A, using the original feature f, the training DNN encoder 822 part 2 can also generate an DNN encoded representation y. Based on both $\hat{y}$ and y, the representation discrimination loss generator 824 computes a representation discrimination loss $L_r(\hat{y},y)$ through a compute representation discrimination loss process. In embodiments, the representation discrimination loss generator 824 is a DNN discriminating the encoded feature representation y that are generated based on the original feature f from the representation $\hat{y}$ that are generated based on the substitutional feature $\hat{f}$. For example, the representation discrimination loss generator 824 can be a binary DNN classifier discriminating the representations generated from the original features as one class and the representations generated from the substitutional features as another class.

When the generator is on the decoder side as in FIGS. 8B and 8C, using the original feature f, the training DNN decoder 848 part 2 can also compute a reconstructed output image $\hat{x}$. Based on both $\hat{x}$ and $\bar{x}$, the reconstruction discrimination loss generator 850 computes a reconstruction discrimination loss $L_r(\hat{x}, \bar{x})$ through a compute reconstruction discrimination loss process. In embodiments, the reconstruction discrimination loss generator 850 is a DNN discriminating the reconstructed output image $\hat{x}$ that are generated based on the original feature f from the reconstructed output image $\bar{x}$ that are generated based on the substitutional feature $\hat{f}$. For example, the reconstruction discrimination loss generator 850 can be a binary DNN classifier discriminating the reconstructed output images generated from the original features as one class and the reconstructed output images generated from the substitutional features as another class.

When the generator is on the encoder side, as shown in FIG. 8A, based on the feature discrimination loss $L_f(\hat{f}, f)$ and the representation discrimination loss $L_r(\hat{y}, y)$, the weight update portion 826 computes an adversarial loss $A(\hat{f}, f, \hat{y}, y)$ as ($\alpha$ as a hyperparameter):

$$A(\hat{f}, f, \hat{y}, y) = L_f(\hat{f}, f) + \alpha L_r(\hat{y}, y). \tag{4}$$

And using $L(x, \bar{x}, \bar{y})$ and $A(\hat{f}, f, \hat{y}, y)$, the weight update portion 826 updates the weight coefficients of the trainable parts of the DNN models using the gradients through back-propagation optimization. In embodiments, the weight coefficients of the model instance $M_o$ (including the training DNN encoder 802 part 1, the training DNN encoder 806 part 2, the training encoder 808, the training decoder 810, and the training DNN decoder 812) are fixed during the above described training stage. Also, the rate loss generator 816 is pre-determined and fixed too. The weight coefficients of the substitute generator 804, the feature discrimination loss generator 820 and the representation discrimination loss generator 824 are trainable and updated through the above described training stage, by a GAN training framework. For example, in embodiments, the gradients of the R-D loss $L(x, \bar{x}, \bar{y})$ are used to update the weight coefficients of the substitute generator 804, and the gradients of the adversarial loss $A(\hat{f}, f, \hat{y}, y)$ are used to update the weight coefficients of the feature discrimination loss generator 820 and the representation discrimination loss generator 824.

When the generator is on the decoder side as shown in FIGS. 8B and 8C, based on the feature discrimination loss $L_f(\hat{f}, f)$ and the reconstruction discrimination loss $L_r(\hat{x}, \bar{x})$, the weight update portion 852 computes an adversarial loss $A(\hat{f}, f, \hat{x}, x)$ as ($\alpha$ as a hyperparameter):

$$A(\hat{f}, f, \hat{x}, \bar{x}) = L_f(\hat{f}, f) + \alpha L_r(\hat{x}, \bar{x}). \tag{5}$$

Base on $L(x, \bar{x}, \bar{y})$ and $A(\hat{f}, f, \hat{x}, x)$, the weight update portion 852 updates the weight coefficients of the trainable parts of the DNN models using the gradients through back-propagation optimization. In embodiments, the weight coefficients of the model instance $M_o$ (including the training DNN encoder 828, the training encoder 830, the training decoder 832, training DNN decoder 834 part 1, and the training DNN decoder 838 part 2) are fixed during the above described training stage. Also, the rate loss generator 842 is pre-determined and fixed too. The weight coefficients of the substitute generator 836, the feature discrimination loss generator 846 and the reconstruction discrimination loss generator 850 are trainable and updated through the above described training stage, by a GAN training framework. For example, in embodiments, the gradients of the R-D loss L(x, x̄, ȳ) are used to update the weight coefficients of the substitute generator 836, and the gradients of the adversarial loss A(f̂, f, x̂, x) are used to update the weight coefficients of the feature discrimination loss generator 846 and the reconstruction discrimination loss generator 850.

In this disclosure, there are not any restrictions on the pre-training process in which the model instance $M_o$ and the rate loss generator 816 or 842 are determined. As an example, in embodiments, a set of training images $S_{pre}$ are used in the pre-training process, which can be the same or different from the training data set S. For each image x ∈ $S_{pre}$, the same forward inference computation is conducted through DNN encoding, encoding, decoding, DNN decoding to compute the encoded representation ȳ and the reconstructed x̄. Then the distortion loss D(x, x̄) and the rate loss R(ȳ) can be computed. Then, given a pre-train hyperparameter $\lambda_{pre}$, the overall R-D loss $L(x, \bar{x}, \bar{y})$ can be computed based on Equation (1), whose gradients are used to update the weights of the training DNN encoder 802, 806 or 828, the training encoder 808 or 830, the training decoder 810 or 832, the training DNN decoder 812, 834 or 838, and the rate loss generator 816 or 842 through back-propagation.

It is also worth mentioning that in embodiments, for the case of encoder-side substitute generator 804 in FIG. 8A, the training DNN encoder 802 part 1, the training DNN encoder 806 part 2, and the training DNN decoder 812 are the same as the corresponding test DNN encoder 705 part 1, the test DNN encoder 715 part 2, and the test DNN decoder 730. Similarly, for the case of decoder-size substitute generator 836 in FIGS. 8B and 8C, the training DNN encoder 828, the training DNN decoder 834 part 1, and the training DNN decoder 838 part 2 are the same as the corresponding test DNN encoder 740, the test DNN decoder 755 part 1, and the test DNN decoder 765 part 2. The training encoder 808 or 830 and the training decoder 810 or 832, on the other hand, are different from the corresponding test encoder 720 or 745 and the test decoder 725 or 750. For example, the test encoder 720 or 745 and test decoder 725 or 75 include a general test quantizer and test entropy encoder, and a general test entropy decoder and test dequantizer, respectively. Each of the training encoder 808 or 830 and training decoder 810 or 832 uses a statistic sampler to approximate the effect of the test quantizer and the test dequantizer, respectively. The entropy encoder and decoder are skipped in the training stage.

Figure 9:
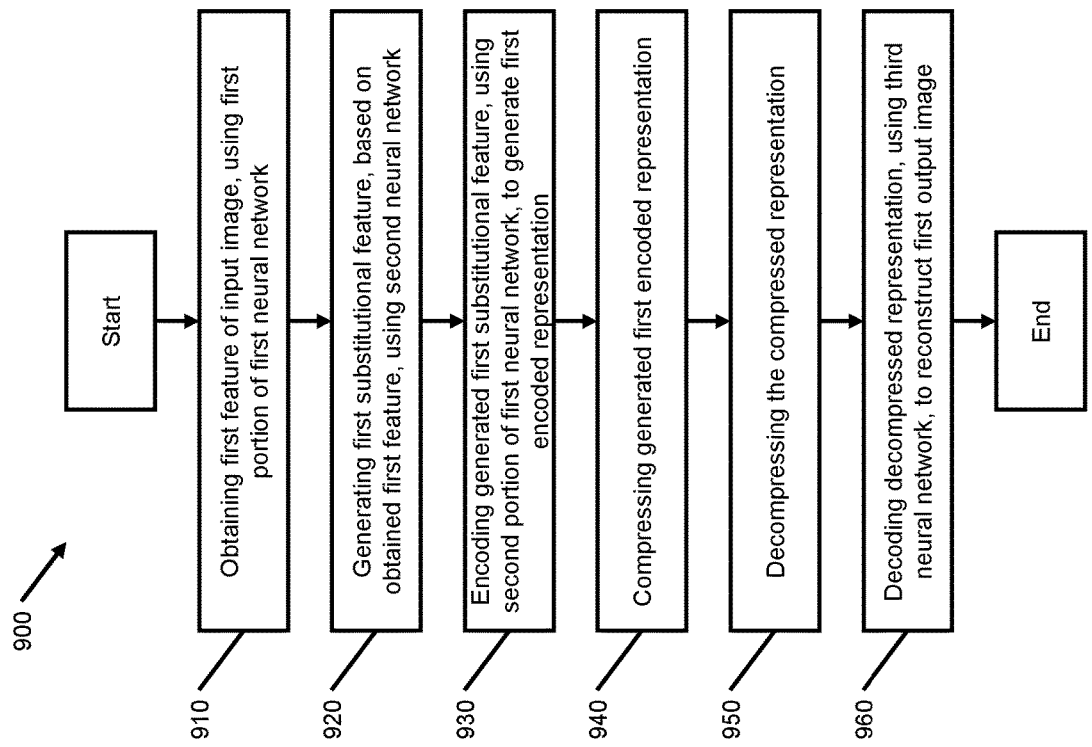
FIG. 9 is a flowchart of a method of rate-adaptive neural image compression with adversarial generators, according to embodiments.

FIG. 9 is a flowchart of a method 900 of rate-adaptive neural image compression with adversarial generators, according to embodiments.

In some implementations, one or more process blocks of FIG. 9 may be performed by the platform 120. In some implementations, one or more process blocks of FIG. 9 may be performed by another device or a group of devices separate from or including the platform 120, such as the user device 110.

As shown in FIG. 9, in operation 910, the method 900 includes obtaining a first feature of an input image, using a first portion of a first neural network.

In operation 920, the method 900 includes generating a first substitutional feature, based on the obtained first feature, using a second neural network.

In operation 930, the method 900 includes encoding the generated first substitutional feature, using a second portion of the first neural network, to generate a first encoded representation.

In operation 940, the method 900 includes compressing the generated first encoded representation.

In operation 950, the method 900 includes decompressing the compressed representation.

In operation 960, the method 900 includes decoding the decompressed representation, using a third neural network, to reconstruct a first output image.

The second neural network may be trained by determining a rate loss of the compressed representation, determining a distortion loss between the input image and the reconstructed first output image, encoding the obtained first feature, using a third portion of the first neural network, to generate a second encoded representation, determining a representation discrimination loss between the generated first encoded representation and the generated second encoded representation, using a fourth neural network, determining a feature discrimination loss between the generated first substitutional feature and the obtained first feature, using a fifth neural network, and updating weight coefficients of the second neural network, the fourth neural network and the fifth neural network, to optimize the determined rate loss, the determined distortion loss, the determined representation discrimination loss and the determined feature discrimination loss.

The method 900 may further include encoding the input image, using the first neural network, to generate the first encoded representation, obtaining a second feature from the decompressed representation, using a first portion of the third neural network, generating a second substitutional feature, based on the obtained second feature, using a fourth neural network, and decoding the generated second substitutional feature, using a second portion of the third neural network, to reconstruct the first output image.

The fourth neural network may be trained by determining a rate loss of the compressed representation, determining a distortion loss between the input image and the reconstructed first output image, decoding the obtained second feature, using a third portion of the third neural network, to reconstruct a second output image, determining a representation discrimination loss between the reconstructed first output image and the reconstructed second output image, using a fifth neural network, determining a feature discrimination loss between the generated second substitutional feature and the obtained second feature, using a sixth neural network, and updating weight coefficients of the fourth neural network, the fifth neural network and the sixth neural network, to optimize the determined rate loss, the determined distortion loss, the determined representation discrimination loss and the determined feature discrimination loss.

The method 900 may further include obtaining a third feature of the input image, using the first neural network, and generating an attention map, based on the obtained third feature. The generating the second substitutional feature may include generating the second substitutional feature, based on the obtained second feature and the generated attention map, using the fourth neural network.

The method 900 may further include obtaining a third feature from the decompressed representation, using the first portion of the third neural network, and generating an attention map, based on the obtained third feature. The generating the second substitutional feature may include generating the second substitutional feature, based on the obtained second feature and the generated attention map, using the fourth neural network.

The method 900 may further include obtaining a second feature of the input image, using the first portion of the first neural network, and generating an attention map, based on the obtained second feature. The generating the first substitutional feature may include generating the first substitutional feature, based on the obtained first feature and the generated attention map, using the second neural network.

Although FIG. 9 shows example blocks of the method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel.

Figure 10:
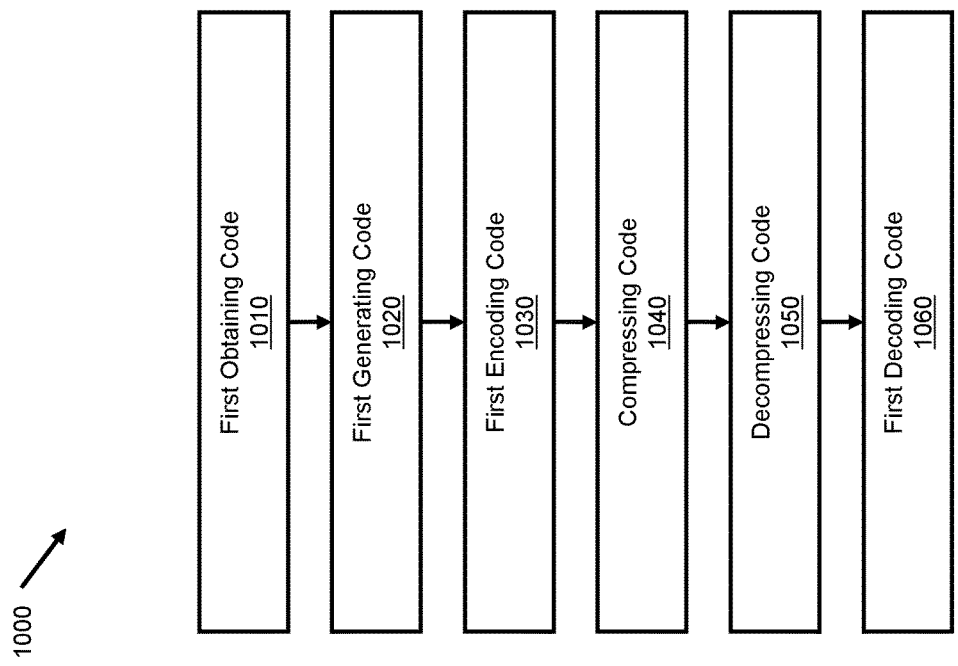
FIG. 10 is a block diagram of an apparatus for rate-adaptive neural image compression with adversarial generators, according to embodiments.

FIG. 10 is a block diagram of an apparatus 1000 for rate-adaptive neural image compression with adversarial generators, according to embodiments.

As shown in FIG. 10, the apparatus 1000 includes first obtaining code 1010, first generating code 1020, first encoding code 1030, compressing code 1040, decompressing code 1050, and first decoding code 1060.

The first obtaining code 1010 is configured to cause at least one processor to obtain a first feature of an input image, using a first portion of a first neural network.

The first generating code 1020 is configured to cause the at least one processor to generate a first substitutional feature, based on the obtained first feature, using a second neural network.

The first encoding code 1030 is configured to cause the at least one processor to encode the generated first substitutional feature, using a second portion of the first neural network, to generate a first encoded representation.

The compressing code 1040 is configured to cause the at least one processor to compress the generated first encoded representation.

The decompressing code 1050 is configured to cause the at least one processor to decompress the compressed representation.

The first decoding code 1060 is configured to cause the at least one processor to decode the decompressed representation, using a third neural network, to reconstruct a first output image.

The second neural network may be trained by determining a rate loss of the compressed representation, determining a distortion loss between the input image and the reconstructed first output image, encoding the obtained first feature, using a third portion of the first neural network, to generate a second encoded representation, determining a representation discrimination loss between the generated first encoded representation and the generated second encoded representation, using a fourth neural network, determining a feature discrimination loss between the generated first substitutional feature and the obtained first feature, using a fifth neural network, and updating weight coefficients of the second neural network, the fourth neural network and the fifth neural network, to optimize the determined rate loss, the determined distortion loss, the determined representation discrimination loss and the determined feature discrimination loss.

The apparatus 1000 may further include second encoding code configured to cause the at least one processor to encode the input image, using the first neural network, to generate the first encoded representation, second obtaining code configured to cause the at least one processor to obtain a second feature from the decompressed representation, using a first portion of the third neural network, second generating code configured to cause the at least one processor to generate a second substitutional feature, based on the obtained second feature, using a fourth neural network, and second decoding code configured to cause the at least one processor to decode the generated second substitutional feature, using a second portion of the third neural network, to reconstruct the first output image.

The fourth neural network may be trained by determining a rate loss of the compressed representation, determining a distortion loss between the input image and the reconstructed first output image, decoding the obtained second feature, using a third portion of the third neural network, to reconstruct a second output image, determining a representation discrimination loss between the reconstructed first output image and the reconstructed second output image, using a fifth neural network, determining a feature discrimination loss between the generated second substitutional feature and the obtained second feature, using a sixth neural network, and updating weight coefficients of the fourth neural network, the fifth neural network and the sixth neural network, to optimize the determined rate loss, the determined distortion loss, the determined representation discrimination loss and the determined feature discrimination loss.

The apparatus 1000 may further include third obtaining code configured to cause the at least one processor to obtain a third feature of the input image, using the first neural network, and third generating code configured to cause the at least one processor to generate an attention map, based on the obtained third feature. The second generating code may be further configured to cause the at least one processor to generate the second substitutional feature, based on the obtained second feature and the generated attention map, using the fourth neural network.

The apparatus 1000 may further include third obtaining code configured to cause the at least one processor to obtain a third feature from the decompressed representation, using the first portion of the third neural network, and third generating code configured to cause the at least one processor to generate an attention map, based on the obtained third feature. The second generating code may be further configured to cause the at least one processor to generate the second substitutional feature includes generating the second substitutional feature, based on the obtained second feature and the generated attention map, using the fourth neural network.

The apparatus 1000 may further include second obtaining code configured to cause the at least one processor to obtain a second feature of the input image, using the first portion of the first neural network, and second generating code configured to cause the at least one processor to generate an attention map, based on the obtained second feature. The first generating code 1020 may be further configured to cause the at least one processor to generate the first substitutional feature, based on the obtained first feature and the generated attention map, using the second neural network.

Comparing with the conventional end-to-end (E2E) image compression methods, the described embodiments have the following new features. A compact adversarial generator adapts a NIC model instance that is trained for an anchor R-D trade-off $\lambda_o$ value to simulate the compression effect of an intermediate R-D trade-off $\lambda_t$ value. A common generator is trained offline to adapt the NIC model instance in a data agnostic way, so that no online learning or feedback is needed for such adaptation.

Comparing with the conventional E2E image compression methods, the described embodiments have the following advantages: a largely reduced deployment storage to achieve multi-rate compression, and a flexible framework that accommodates various types of NIC models. Further, an attention-based generator may focus on salient information for model adaptation.

The methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of rate-adaptive neural image compression with adversarial generators, the method being performed by at least one processor, and the method comprising:
    obtaining a first feature of an input image, using a first portion of a first neural network;
    generating a first substitutional feature, based on the obtained first feature, using a second neural network;
    encoding the generated first substitutional feature, using a second portion of the first neural network, to generate a first encoded representation;
    compressing the generated first encoded representation;
    decompressing the compressed representation; and
    decoding the decompressed representation, using a third neural network, to reconstruct a first output image,
    wherein the second neural network is trained based on a rate loss of the compressed representation and a distortion loss determined between the input image and the reconstructed first output image.

2. The method of claim 1, wherein the second neural network is trained by:
    encoding the obtained first feature, using a third portion of the first neural network, to generate a second encoded representation;
    determining a representation discrimination loss between the generated first encoded representation and the generated second encoded representation, using a fourth neural network;
    determining a feature discrimination loss between the generated first substitutional feature and the obtained first feature, using a fifth neural network; and
    updating weight coefficients of the second neural network, the fourth neural network and the fifth neural network, to optimize the determined rate loss, the determined distortion loss, the determined representation discrimination loss and the determined feature discrimination loss.

3. The method of claim 1, further comprising:
    encoding the input image, using the first neural network, to generate the first encoded representation;
    obtaining a second feature from the decompressed representation, using a first portion of the third neural network;
    generating a second substitutional feature, based on the obtained second feature, using a fourth neural network; and
    decoding the generated second substitutional feature, using a second portion of the third neural network, to reconstruct the first output image.

4. The method of claim 3, wherein the fourth neural network is trained by:
    decoding the obtained second feature, using a third portion of the third neural network, to reconstruct a second output image;
    determining a representation discrimination loss between the reconstructed first output image and the reconstructed second output image, using a fifth neural network;
    determining a feature discrimination loss between the generated second substitutional feature and the obtained second feature, using a sixth neural network; and
    updating weight coefficients of the fourth neural network, the fifth neural network and the sixth neural network, to optimize the determined rate loss, the determined distortion loss, the determined representation discrimination loss and the determined feature discrimination loss.

5. The method of claim 3, further comprising:
    obtaining a third feature of the input image, using the first neural network; and
    generating an attention map, based on the obtained third feature,
    wherein the generating the second substitutional feature comprises generating the second substitutional feature, based on the obtained second feature and the generated attention map, using the fourth neural network.

6. The method of claim 3, further comprising:
obtaining a third feature from the decompressed representation, using the first portion of the third neural network; and
generating an attention map, based on the obtained third feature,
wherein the generating the second substitutional feature comprises generating the second substitutional feature, based on the obtained second feature and the generated attention map, using the fourth neural network.

7. The method of claim 1, further comprising:
obtaining a second feature of the input image, using the first portion of the first neural network; and
generating an attention map, based on the obtained second feature,
wherein the generating the first substitutional feature comprises generating the first substitutional feature, based on the obtained first feature and the generated attention map, using the second neural network.

8. An apparatus for rate-adaptive neural image compression with adversarial generators, the apparatus comprising:
at least one memory configured to store program code; and
at least one processor configured to read the program code and operate as instructed by the program code, the program code comprising:
first obtaining code configured to cause the at least one processor to obtain a first feature of an input image, using a first portion of a first neural network;
first generating code configured to cause the at least one processor to generate a first substitutional feature, based on the obtained first feature, using a second neural network;
first encoding code configured to cause the at least one processor to encode the generated first substitutional feature, using a second portion of the first neural network, to generate a first encoded representation;
compressing code configured to cause the at least one processor to compress the generated first encoded representation;
decompressing code configured to cause the at least one processor to decompress the compressed representation; and
first decoding code configured to cause the at least one processor to decode the decompressed representation, using a third neural network, to reconstruct a first output image,
wherein the second neural network is trained based on a rate loss of the compressed representation and a distortion loss determined between the input image and the reconstructed first output image.

9. The apparatus of claim 8, wherein the second neural network is trained by:
encoding the obtained first feature, using a third portion of the first neural network, to generate a second encoded representation;
determining a representation discrimination loss between the generated first encoded representation and the generated second encoded representation, using a fourth neural network;
determining a feature discrimination loss between the generated first substitutional feature and the obtained first feature, using a fifth neural network; and
updating weight coefficients of the second neural network, the fourth neural network and the fifth neural network, to optimize the determined rate loss, the determined distortion loss, the determined representation discrimination loss and the determined feature discrimination loss.

10. The apparatus of claim 8, wherein the program code further comprises:
second encoding code configured to cause the at least one processor to encode the input image, using the first neural network, to generate the first encoded representation;
second obtaining code configured to cause the at least one processor to obtain a second feature from the decompressed representation, using a first portion of the third neural network;
second generating code configured to cause the at least one processor to generate a second substitutional feature, based on the obtained second feature, using a fourth neural network; and
second decoding code configured to cause the at least one processor to decode the generated second substitutional feature, using a second portion of the third neural network, to reconstruct the first output image.

11. The apparatus of claim 10, wherein the fourth neural network is trained by:
decoding the obtained second feature, using a third portion of the third neural network, to reconstruct a second output image;
determining a representation discrimination loss between the reconstructed first output image and the reconstructed second output image, using a fifth neural network;
determining a feature discrimination loss between the generated second substitutional feature and the obtained second feature, using a sixth neural network; and
updating weight coefficients of the fourth neural network, the fifth neural network and the sixth neural network, to optimize the determined rate loss, the determined distortion loss, the determined representation discrimination loss and the determined feature discrimination loss.

12. The apparatus of claim 10, wherein the program code further comprises:
third obtaining code configured to cause the at least one processor to obtain a third feature of the input image, using the first neural network; and
third generating code configured to cause the at least one processor to generate an attention map, based on the obtained third feature,
wherein the second generating code is further configured to cause the at least one processor to generate the second substitutional feature, based on the obtained second feature and the generated attention map, using the fourth neural network.

13. The apparatus of claim 10, wherein the program code further comprises:
third obtaining code configured to cause the at least one processor to obtain a third feature from the decompressed representation, using the first portion of the third neural network; and
third generating code configured to cause the at least one processor to generate an attention map, based on the obtained third feature,
wherein the second generating code is further configured to cause the at least one processor to generate the second substitutional feature comprises generating the second substitutional feature, based on the obtained second feature and the generated attention map, using the fourth neural network.

14. The apparatus of claim 8, wherein the program code further comprises:
second obtaining code configured to cause the at least one processor to obtain a second feature of the input image, using the first portion of the first neural network; and
second generating code configured to cause the at least one processor to generate an attention map, based on the obtained second feature,
wherein the first generating code is further configured to cause the at least one processor to generate the first substitutional feature, based on the obtained first feature and the generated attention map, using the second neural network.

15. A non-transitory computer-readable medium storing instructions that, when executed by at least one processor for rate-adaptive neural image compression with adversarial generators, cause the at least one processor to:
obtain a first feature of an input image, using a first portion of a first neural network;
generate a first substitutional feature, based on the obtained first feature, using a second neural network;
encode the generated first substitutional feature, using a second portion of the first neural network, to generate a first encoded representation;
compress the generated first encoded representation;
decompress the compressed representation; and
decode the decompressed representation, using a third neural network, to reconstruct a first output image,
wherein the second neural network is trained based on a rate loss of the compressed representation and a distortion loss determined between the input image and the reconstructed first output image.

16. The non-transitory computer-readable medium of claim 15, wherein the second neural network is trained by:
encoding the obtained first feature, using a third portion of the first neural network, to generate a second encoded representation;
determining a representation discrimination loss between the generated first encoded representation and the generated second encoded representation, using a fourth neural network;
determining a feature discrimination loss between the generated first substitutional feature and the obtained first feature, using a fifth neural network; and
updating weight coefficients of the second neural network, the fourth neural network and the fifth neural network, to optimize the determined rate loss, the determined distortion loss, the determined representation discrimination loss and the determined feature discrimination loss.

17. The non-transitory computer-readable medium of claim 15, wherein the instructions, when executed by the at least one processor, further cause the at least one processor to:
encode the input image, using the first neural network, to generate the first encoded representation;
obtain a second feature from the decompressed representation, using a first portion of the third neural network;
generate a second substitutional feature, based on the obtained second feature, using a fourth neural network; and
decode the generated second substitutional feature, using a second portion of the third neural network, to reconstruct the first output image.

18. The non-transitory computer-readable medium of claim 17, wherein the fourth neural network is trained by:
decoding the obtained second feature, using a third portion of the third neural network, to reconstruct a second output image;
determining a representation discrimination loss between the reconstructed first output image and the reconstructed second output image, using a fifth neural network;
determining a feature discrimination loss between the generated second substitutional feature and the obtained second feature, using a sixth neural network; and
updating weight coefficients of the fourth neural network, the fifth neural network and the sixth neural network, to optimize the determined rate loss, the determined distortion loss, the determined representation discrimination loss and the determined feature discrimination loss.

19. The non-transitory computer-readable medium of claim 17, wherein the instructions, when executed by the at least one processor, further cause the at least one processor to:
obtain a third feature of the input image, using the first neural network;
generate an attention map, based on the obtained third feature; and
generate the second substitutional feature, based on the obtained second feature and the generated attention map, using the fourth neural network.

20. The non-transitory computer-readable medium of claim 17, wherein the instructions, when executed by the at least one processor, further cause the at least one processor to:
obtain a third feature from the decompressed representation, using the first portion of the third neural network;
generate an attention map, based on the obtained third feature; and
generate the second substitutional feature, based on the obtained second feature and the generated attention map, using the fourth neural network.

* * * * *